US008164484B2

(12) United States Patent
Berger et al.

(10) Patent No.: US 8,164,484 B2
(45) Date of Patent: Apr. 24, 2012

(54) DETECTION AND CLASSIFICATION OF RUNNING VEHICLES BASED ON ACOUSTIC SIGNATURES

(75) Inventors: Theodore W. Berger, Rancho Palos Verdes, CA (US); Alireza Dibazar, Los Angeles, CA (US); Bing Lu, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 588 days.

(21) Appl. No.: 12/245,564

(22) Filed: Oct. 3, 2008

(65) Prior Publication Data

US 2009/0115635 A1 May 7, 2009

Related U.S. Application Data

(60) Provisional application No. 60/977,276, filed on Oct. 3, 2007, provisional application No. 61/052,364, filed on May 12, 2008.

(51) Int. Cl.
*G09G 1/04* (2006.01)
(52) U.S. Cl. ............... 340/943; 340/539.1; 367/127; 701/119
(58) Field of Classification Search .............. 340/943, 340/941, 933, 539.1, 825.71, 825.72; 367/127, 367/128; 381/56, 86; 701/207, 213, 209, 701/212, 117, 119
See application file for complete search history.

(56) References Cited

U.S. PATENT DOCUMENTS

| | | | |
|---|---|---|---|
| 4,110,730 A | 8/1978 | Varecka | |
| 5,021,766 A | 6/1991 | Genahr et al. | |
| 5,083,304 A | 1/1992 | Cahill | |
| 5,477,324 A | 12/1995 | Berthelot et al. | |
| 5,774,846 A | 6/1998 | Morii | |
| 5,973,998 A | 10/1999 | Showen et al. | |

(Continued)

FOREIGN PATENT DOCUMENTS

WO 2009/046359 A2 4/2009

(Continued)

OTHER PUBLICATIONS

International Search Report for PCT Application Serial No. PCT/US08/078829, mailed on Mar. 17, 2009.

(Continued)

*Primary Examiner* — Hung T. Nguyen
(74) *Attorney, Agent, or Firm* — McDermott Will & Emery LLP

(57) ABSTRACT

A method and apparatus for identifying running vehicles in an area to be monitored using acoustic signature recognition. The apparatus includes an input sensor for capturing an acoustic waveform produced by a vehicle source, and a processing system. The waveform is digitized and divided into frames. Each frame is filtered into a plurality of gammatone filtered signals. At least one spectral feature vector is computed for each frame. The vectors are integrated across a plurality of frames to create a spectro-temporal representation of the vehicle waveform. In a training mode, values from the spectro-temporal representation are used as inputs to a Nonlinear Hebbian learning function to extract acoustic signatures and synaptic weights. In an active mode, the synaptic weights and acoustic signatures are used as patterns in a supervised associative network to identify whether a vehicle is present in the area to be monitored. In response to a vehicle being present, the class of vehicle is identified. Results may be provided to a central computer.

24 Claims, 17 Drawing Sheets

U.S. PATENT DOCUMENTS

| | | | |
|---|---|---|---|
| 6,014,447 | A | 1/2000 | Kohnen et al. |
| 6,135,965 | A | 10/2000 | Tumer et al. |
| 6,643,627 | B2 | 11/2003 | Liaw et al. |
| 6,798,715 | B2 | 9/2004 | Harmon et al. |
| 6,914,854 | B1 * | 7/2005 | Heberley et al. .............. 367/119 |
| 6,944,590 | B2 | 9/2005 | Deng et al. |
| 7,203,132 | B2 | 4/2007 | Berger |
| 7,420,878 | B2 * | 9/2008 | Holmes et al. ................ 367/128 |
| 7,558,156 | B2 * | 7/2009 | Vook et al. .................... 367/127 |
| 2007/0120668 | A1 | 5/2007 | Boyd et al. |
| 2008/0106403 | A1 | 5/2008 | Voglewede et al. |
| 2008/0234983 | A1 | 9/2008 | Leigh et al. |
| 2009/0309725 | A1 | 12/2009 | Berger et al. |
| 2010/0260011 | A1 | 10/2010 | Berger et al. |
| 2010/0268671 | A1 | 10/2010 | Berger et al. |

FOREIGN PATENT DOCUMENTS

| | | | |
|---|---|---|---|
| WO | 2010/118233 | A2 | 10/2010 |

OTHER PUBLICATIONS

U.S. Appl. No. 12/245,575, filed Oct. 3, 2008, entitled "Acoustic Signature Recognition of Running Vehicles Using Spectro-Temporal Dynamic Neural Network," Berger et al., inventors.

U.S. Appl. No. 12/763,974, filed Apr. 20, 2010, entitled "Fence Intrusion Detection," Berger et al., inventors.

International Search Report and Written Opinion, dated Oct. 27, 2010 (ISA-KIPO), for P.C.T. Application No. PCT/US2010/030394, filed Apr. 8, 2010 (Published as WO 2010/118233), entitled "Cadence Analysis of Temporal Gait patterns for Seismic Discrimination," Berger et al., inventors.

Notice of Allowance, mailed Apr. 18, 2011, for U.S. Appl. No. 12/244,549, filed Oct. 2, 2008, entitled "Systems and Methods for Security Breach Detection," Berger et al., inventors.

* cited by examiner

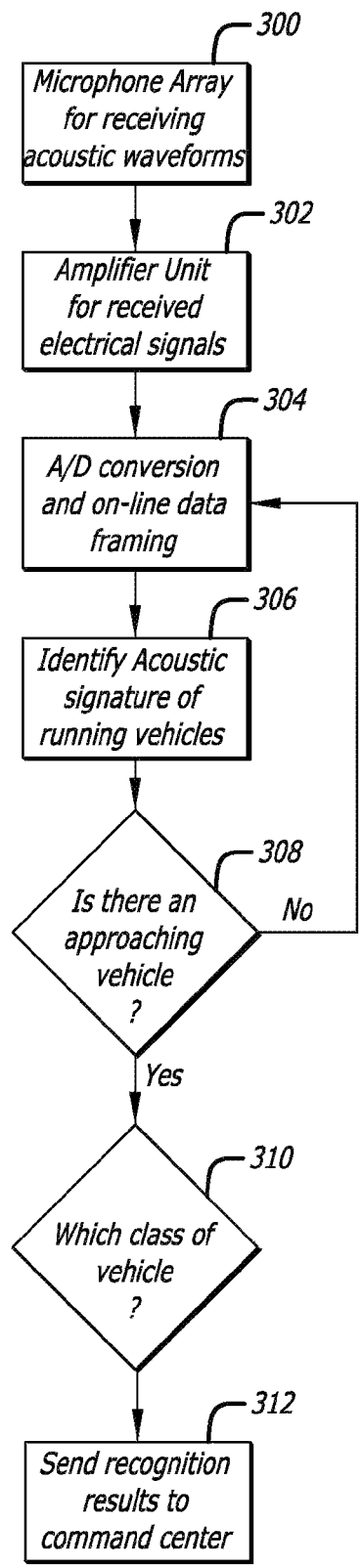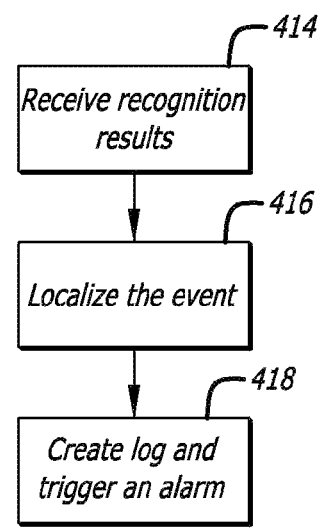
FIG. 3
FIG. 4

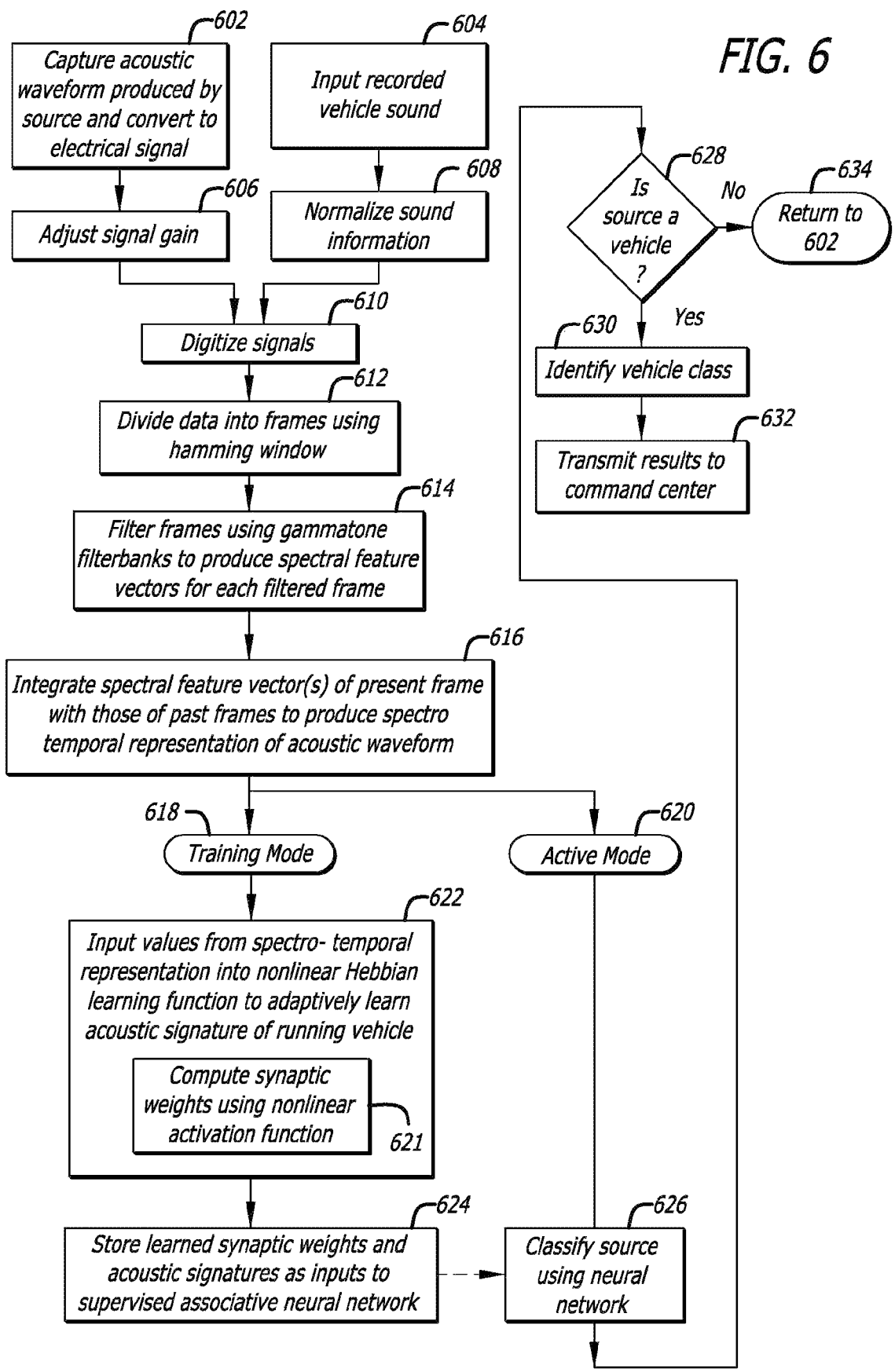

DETECTION AND CLASSIFICATION OF RUNNING VEHICLES BASED ON ACOUSTIC SIGNATURES

CROSS-REFERENCE TO RELATED APPLICATION(S)

This application is based upon and claims priority to U.S. Provisional Patent Application Ser. Nos. 60/977,276, entitled "Security Breach Detection and Classification of Running Vehicles Based on Acoustic Signatures Using Radial Basis Function Neural Network," filed Oct. 3, 2007, the entire content of which is incorporated herein by reference, and 61/052,364, entitled "Using Spectro-Temporal Dynamic Neural Network and Nonlinear Hebbian Learning for Noise-Independent Detection and Identification of Running Vehicle Based on Acoustic Signatures," filed May 12, 2008, the entire content of which is incorporated herein by reference.

STATEMENT REGARDING FEDERALLY SPONSORED RESEARCH

This work was made with government support under Grant Nos. N00014-06-1-0117, N00014-05-C-0435, and N00014-07-1-0132, awarded by the Office of Naval Research; and Grant No. SD 121905, awarded by the ONR/ARO/SD. The government has certain rights in the invention.

BACKGROUND

1. Field

This application relates to acoustic recognition.

2. Description of Related Art

The technology of recognizing acoustic signatures of various sources has gained increasing interest as applications based on sound recognition continue to proliferate. Detection of objects such as running vehicles based on acoustic signatures is one such application. From an acoustic waveform of a running vehicle, for example, characteristic patterns in a "training mode" may be extracted, associated with the vehicle, and stored for subsequent comparison with candidate vehicle sounds in a real world environment. Where a "match" is found to exist, a positive identification may be deemed to have occurred.

Among the significant challenges faced by practitioners include developing an acoustic recognition technique that can function effectively in this real world environment. Under typical circumstances in such an environment, a variety of environmental sounds and noises, whether expected or unexpected, inevitably will accompany the acoustic waveform associated with the vehicle of interest. Such sounds may include, for example, wind, rain, the scuffling of feet, human voices, the chirping of a bird, etc. Still other sounds may be machine-generated, such as the sound of an industrial plant located in the vicinity or of a jet taking off. To deal with these problems, a noise-robust acoustic recognition system for vehicles is needed that can quickly and effectively differentiate these types of sounds from potential vehicle sounds to identify whether a vehicle or other object of interest is present in the monitored area.

The running vehicle itself may too contribute to the environmental variations, such as, for example, when the vehicle is being driven in the rain or with worn out tires. The acoustic sound of interest from a running vehicle is a complicated one that is affected by multiple factors, such as vehicle types, gearing, number of cylinders, choice of the muffler, state of repair of the vehicle, moving speed, distance from the microphone, and the road on which the vehicle travels. To date, no technique has been developed to effectively account for these variables to provide the needed discrimination between background sounds on one hand, and sounds of interest on the other hand.

Further, existing approaches are incapable of effectively differentiating between different arbitrary classes of vehicles, which would provide an important feature in a growing number of applications.

BRIEF SUMMARY

An acoustic recognition system, method and apparatus is disclosed for detecting and classifying running vehicles in an area to be monitored.

An apparatus for identifying vehicles entering an area to be monitored using acoustic signatures may include one or more microphones configured to capture, within a range of said area, sound produced by a source and to convert said sound into electrical signals, and a processing system configured to measure, from said electrical signals, an acoustic pattern of said source, determine whether said acoustic signature is indicative of a running vehicle, and identify, in response to detecting a running vehicle, a vehicle class.

A method for identifying approaching vehicles entering an area to be monitored using acoustic signatures may include capturing, using one more microphones placed within a range of said area, sound produced by a source and converting said sound into electrical signals, measuring, from said electrical signals, an acoustic pattern of said source, comparing said acoustic pattern with one or more learned acoustic signatures of running vehicles, determining, based on said comparison, whether said acoustic pattern is indicative of a presence of a running vehicle, and identifying, in response to detecting a running vehicle, a vehicle class.

A system for identifying vehicles entering one or more areas to be monitored using acoustic signatures may include a central computer and at least one on-site sensor located within each area to be monitored, each at least one on-site sensor configured to capture, using one more microphones placed within a range of said area, sound produced by a source and convert said sound into digitized electrical signals, measure, from said electrical signals, an acoustic pattern of said source, compare said acoustic pattern with one or more learned acoustic signatures of running vehicles, determine, based on said comparison, whether said acoustic pattern is indicative of a presence of a running vehicle, identify, in response to detecting a running vehicle, a vehicle class, and transmit information sufficient to identify said vehicle class to said central computer.

These, as well as other objects, components, steps, features, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it is intended to refer to the same or like components or steps.

FIG. 3 illustrates a flow diagram of an exemplary method for recognizing acoustic waveforms of running vehicles in accordance with the present disclosure.

FIG. 4 illustrates a flow diagram of a central computer receiving results of an acoustic signature recognition.

FIG. 6 illustrates a flow diagram of an exemplary method for recognizing acoustic waveforms of running vehicles using a spectro-temporal dynamic representation and Nonlinear Hebbian learning in accordance with the present disclosure.

DETAILED DESCRIPTION OF ILLUSTRATIVE EMBODIMENTS

Figure 1:
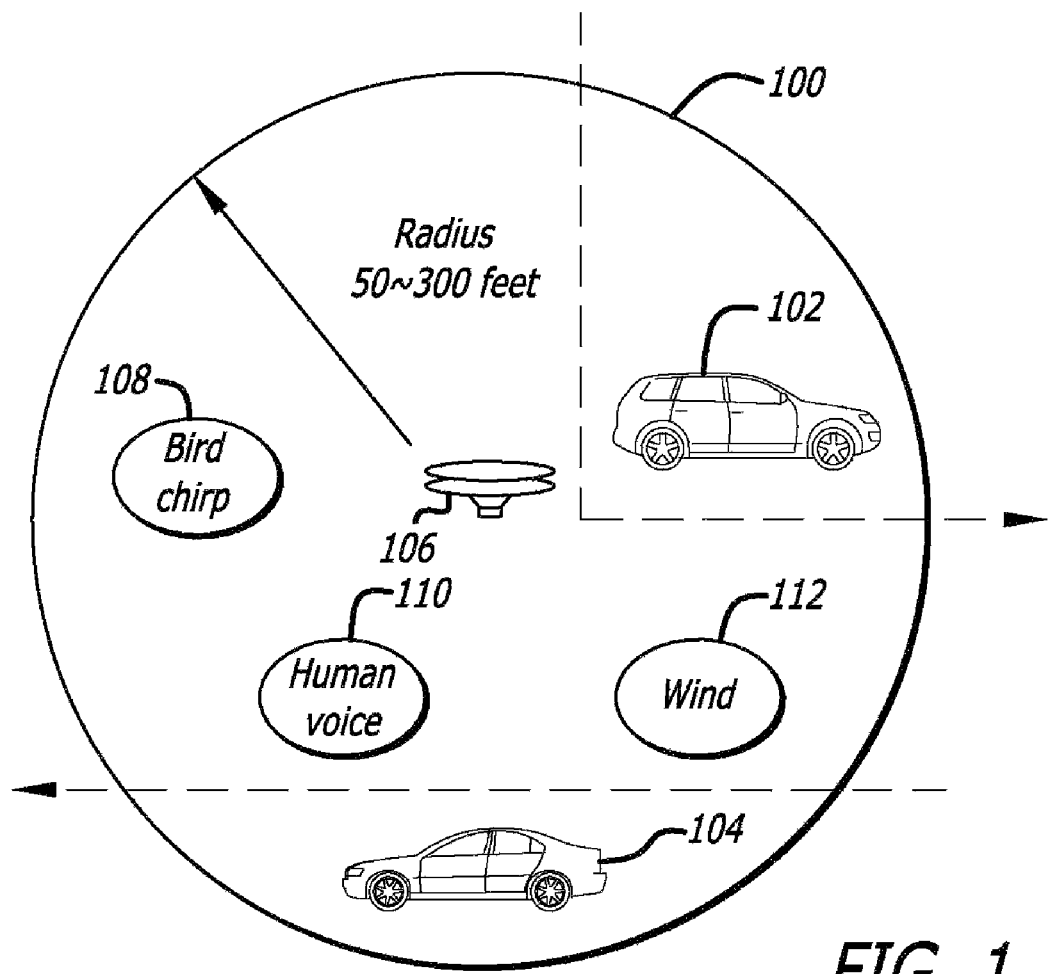
FIG. 1 illustrates an example of a microphone positioned to sense running vehicles and background sounds within a prescribed radius.

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Disclosed herein is a method, system and apparatus for the acoustic signature recognition of running vehicle sources. The system may detect running or approaching vehicles of arbitrary types and recognize several classes of vehicles with minimum error rates. The technique may be used in a variety of applications. One set of applications may generally involve the protection of an asset in a security context. As an example, the recognition system may comprise a security system for monitoring a protected military installation from unauthorized vehicle intrusions. The recognition system may be designed to recognize classes of approaching vehicles that are capable of being loaded with weapons. As one illustration, the acoustic recognition system may be used to detect approaching vehicles that may be loaded with explosives or suicide bombers set out to destroy a military or other asset.

These types of applications generally define a perimeter area around one or more such assets, and monitor the area using microphones. Generally, these fixed-asset applications may vary widely and include, for example, airports, prisons, hospitals, churches, residential areas, historic landmarks, military sites, various types of government facilities, commercial buildings, and the like. The recognition system of the present disclosure may also be used in connection with various types of commercial applications including, for example, vehicle number counting used in automatic parking space management.

The techniques of the present disclosure are well suited for security applications where acoustic signature recognition may be integrated as part of a larger overall security infrastructure. In many security applications, including those involving moving vehicles that may include weapons, providing security using human personnel can be dangerous. In addition, regardless of whether the application involves any significant degree of danger, the use of humans in the security context for constant monitoring duties is generally expensive. The acoustic recognition system disclosed herein may be used in some cases to reduce personnel cost. In other applications, the disclosed system may provide a monitored area with an added degree of perimeter protection and security which may, in turn, obviate the necessity for certain security personnel to be present during certain times, or at specific areas of potential danger.

The acoustic recognition system of the present disclosure mimics beneficial features of the human ear and brain in recognizing and differentiating vehicle sounds by including an artificial intelligent ear (auditory signal processing) and brain-like neural network (nonlinear neural learning). The described acoustic vehicle recognizer may work independently of road composition and condition, and other environmental factors and effects.

Depending on the embodiment, the recognizer may include some or all of the following characteristics. The recognizer may be capable of detecting running vehicles on paved or sandy roads, or on another medium (e.g., grass, mud, sand, etc.). The recognizer may work independently of surrounding background sounds. Thus, a variety of human generated interference sounds (such as talking near the microphone, and scuffling feet on the pavement), a variety of natural sounds (such as bird and insect sounds, a waterfall) and/or mechanical sounds (such as an industrial generator or artillery) may be present, and are generally co-sensed by the microphones along with a running vehicle source. The disclosed system functions efficiently and effectively in spite of the presence of these types of often-existent background sounds. The recognizer is capable, for example, of separating or attenuating these types of background noise effects if the recorded data is a mixture of vehicle sound and noise.

In other embodiments, as noted above, the system is configured to recognize arbitrary types of approaching vehicles against the surrounding background. In one embodiment, the system is capable of discriminating several classes of vehicles, gasoline (light wheeled, heavy wheeled), diesel, motorcycle, and others. Thus, the system and method is noise-robust in that it may detect vehicles of arbitrary types and recognize several classes of vehicles in the face of a variety of vehicle-specific variations and background noises in an area to be monitored. As above, the acoustic recognition system and method according to this embodiment may work independently of road composition and condition, and other environmental factors and effects.

Furthermore, the acoustic recognition system according to one aspect is capable of processing continuously sensed real-time data. The total processing time of the system is typically much smaller than the data acquisition time. As a result, there is no processing delay in the system, rendering a potentially high level of performance.

FIG. 1 illustrates an example of a microphone positioned to sense running vehicles and background sounds within a prescribed radius. Microphone 106 having a radius of 50-300 feet defines an area 100 to be monitored. While one microphone is shown here for simplicity, an array of distributed microphones may alternatively be implemented, for example, in order to localize the source of the sound, to increase the size of area 100, or to create a plurality of areas for monitoring, such as where there a plurality of assets to be protected. In one embodiment as shown below, microphone 106 together with its associated electronics and computing circuitry constitutes a local sensor or on-site sensor for monitoring area 100.

Within a broader system, additional sensors may be distributed within other areas. A discrete central computer may be used in one aspect to receive and process information from the one or more on-site sensors and determine an appropriate response.

Entering or within area 100 are running vehicles 102 and 104. Where the goal of the system is to identify the specific vehicle class from among a set of arbitrary classes, as indicated previously, the acoustic sound of interest from a running vehicle may be complicated and affected by a variety of factors, such as vehicle type, gearing, number of cylinders, muffler choice, state of maintenance, running speed, distance from the microphone, tires, and the road on which the vehicle travels. Besides, the sounds from various types of vehicles may be generated by some common factors and thus highly correlated with each other, rendering vehicle discrimination more challenging. Moreover, the problem is complicated within the area 100 with of the presence of uncontrolled interference emitted by surrounding background, such as human voice 110, bird chirp 108, and wind 112.

Figure 2:
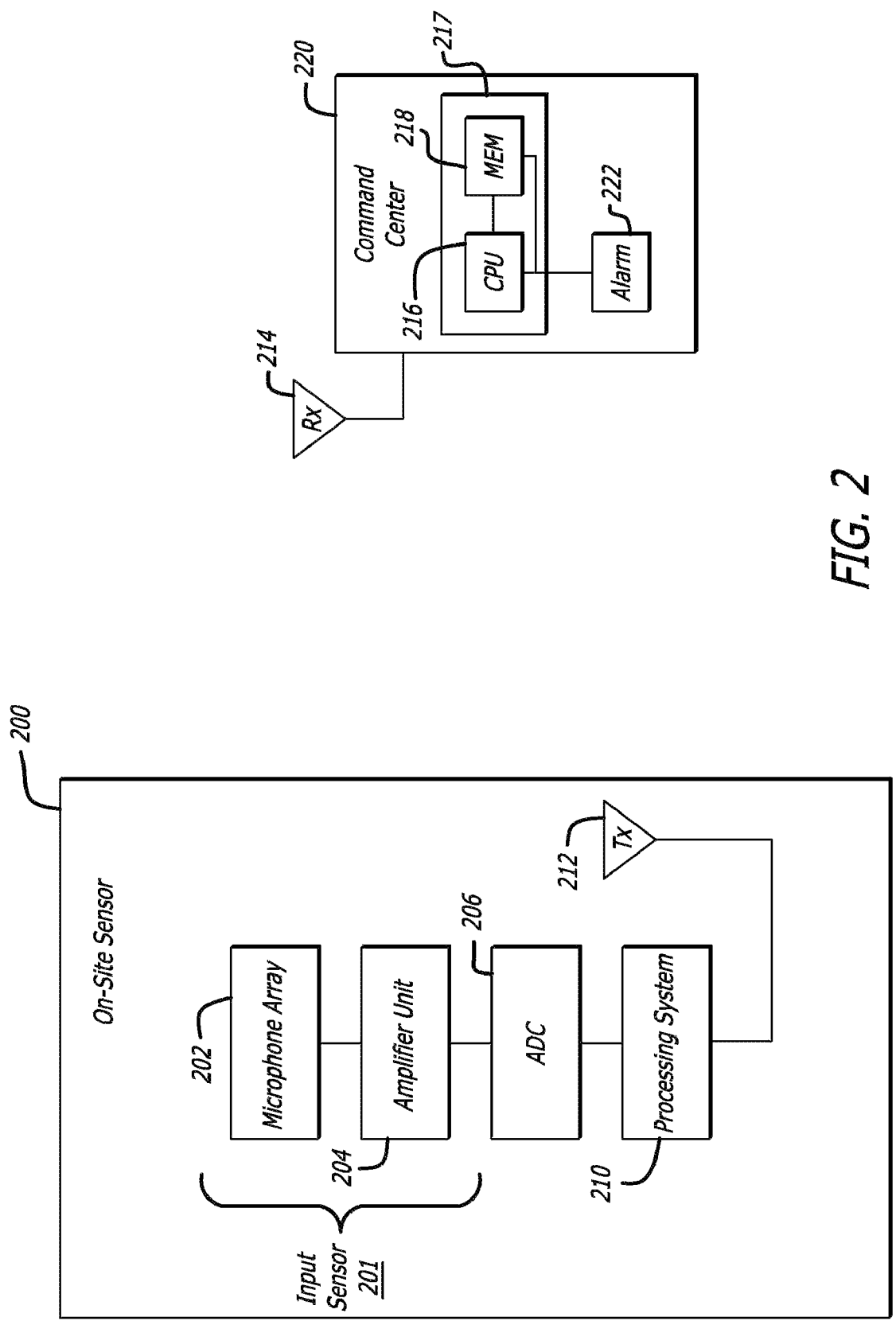
FIG. 2 illustrates a block diagram of a system for recognizing acoustic signatures of vehicles including an on-site sensor and a command center.

FIG. 2 illustrates a block diagram of a system for recognizing acoustic signatures of vehicles including an on-site (local) sensor 200 and a command center 220. The on-site sensor 200 may be positioned in an area to be monitored as described above. On-site sensor 200 includes microphone 202, amplifier unit 204, analog-to-digital converter (ADC) 206, processing system 210, and wireless transmitter 212.

The microphone 202 may in some embodiments be a single microphone, and in other embodiments a clustered or distributed microphone array. Distributed microphone arrays may be used, for example, to more specifically localize the acoustic source.

In the embodiment shown, the combination of the microphone 202, amplifier unit 204, and ADC 206 are referred to as input sensor 201. It will be appreciated, however, that such reference is for conciseness of explanation and does not necessarily require that the components 202, 204 and 206 be actually integrated together on one device, or that they be connected together in precisely the order shown, or that they be connected without other intervening or intermediary components.

Coupled to ADC 206 is processing system 210. In one aspect, processing system 210 comprises an efficient parallel processor for allowing real time detection of acoustic waveforms as well as continuous data acquisition. In general, however, the processing system may be implemented using hardware, software, or a combination of both. By way of example, a processing system may be implemented with one or more integrated circuits (IC). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the general purpose processor may be any conventional processor, controller, microcontroller, or state machine. A processing system may also be implemented as a combination of computing devices, e.g., a combination of a DSP and a microprocessor, a plurality of microprocessors, one or more microprocessors in conjunction with a DSP core, or any other such configuration.

A memory unit (not shown) may be coupled to the processing unit 210. The memory unit may include RAM, ROM, flash memory, or any known type of memory module or integrated circuit in whatever form. Alternatively or additionally, the memory unit may include storage include one or more hard drives, optical drives, tape drives, or other storage. The memory may collectively hold and store information for use by the processing unit as described in this disclosure, including for example, computer programs, learned acoustic signatures, and the like.

Microphone 202 captures an acoustic waveform and converts the waveform to a corresponding electrical signal. The acoustic waveform may include a source such as a running vehicle in the environment particular to the area to be monitored, and may also include background sounds as discussed above. The vehicle source may either be that of a recorded vehicle, such as, for example, when the system is being used in the training mode. Alternatively, the vehicle source may be that of a running vehicle in real time, such as when the system is being used in the active mode.

Amplifier unit 204 in one embodiment comprises a preamplifier to boost the electrical signal and an adjustable gain function. The gain controller associated with amplifier unit 204 in one embodiment is configured to alleviate the effect of the variability of road conditions and surrounding background noises on acoustic waveforms for a particular vehicle. Specifically, the pre-amplifier gain may be adjusted in hardware, or, in other embodiments, automatically in software, to accommodate various road conditions and surrounding backgrounds to help mitigate such variability factors. The gain function is described further below with reference to other embodiments.

The amplified signal is provided to ADC 206 for conversion from a continuous time signal into a discrete time signal. In one embodiment, the converted signal is sampled at a rate of 22,050 Hz. Thereupon, the signal is provided to the processing system where, through the use of a training and an active mode as described in below with reference to FIGS. 5 and 6, the acoustic signature recognition of running vehicles may be realized along with class information of the vehicles. The results may then be sent over a wireless transmitter 212 to the command center 220 coupled to the processing system. In other configurations transmitter 212 may be hardwired. In other embodiments, a command center is not used. Alternatively, the functionality of all or of a subset of the command center 220 may be embodied in on-site sensor 200.

In one set of configurations tested by the inventors, a Micro ATX-based computer and Intel motherboard (D201 GLY2) was used in the setup, and an Intel Celeron® processor 220 with a 533 MHz system bus was used to implement the processing system. Microphone 202 was implemented as one of (i) a 72 dB omni-directional microphone from Compression Zone Microphone (CZM), which uses for a microphone element a Panasonic Electret 6 mm Model WV-61A and a (ii) Knowles standard microphone.

In another test, different hardware was employed, including an Intel® Core™2 Duo Processor at 1.8 GHz as processing system 210.

For configurations used to estimate the location of the vehicle, a four microphone array was employed. ADC 206 was implemented using one of the computer's PCI slots as an National Instrument's® 16-bit, 250 kS/s/ch PCI-6143 card. This card has 8 input channels, out of which four were used in the tested configuration. For single microphone configurations used to detect the presence or absence of a vehicle without more specific localization, Micro ATX's embedded on-board sound system was used in one configuration. In an alternative configuration, Audigy 2's Sound Blaster® was tested.

It will be appreciated that the above test embodiments are described for exemplary purposes only and are not intended to limit or restrict the scope of the invention. In other configurations, including larger scale configurations, other types of processing systems, ADCs, amplifiers, and microphones may be implemented. Additional components and channels may be used. Further, a stand-alone computer may be replaced by integrated circuitry, or alternatively, by discrete dedicated components.

FIG. 2 also illustrates command center 220 which may be used to collect information from a plurality of on-site sensors 200, such as in the case where a plurality of on-site sensors 200 are used to monitor more than one area. Command center 220 may include wireless receiver 214, central computer 217 including CPU 216 and memory 218, and alarm system 222. Command center 220 may in some instances be part of a larger integrated security facility, of which the acoustic signature aspect is one feature. In other embodiments, such as in those where only one area is monitored or the level of sophistication does not warrant the use of separate functional locations, on-site sensor 200 may perform one or more of the functions of command center 220. In this case, wireless transmitter 212 may not be necessary. Command center 220 may also contain functions for controlling one or more video cameras, which may be slewed toward the range of a detected vehicle in response to signals from one of the on-site sensor 200.

FIG. 3 illustrates a general flow diagram of an exemplary method for recognizing acoustic waveforms of classes of running vehicles in accordance with the present disclosure. Acoustic waveforms of running vehicles are received at the microphone arrays and the appropriate gain adjustment is performed (300 and 302). Upon analog to digital conversion, processing begins whereby the electrical signal is divided into temporal data frames (304). In one embodiment, on-line recorded day is framed with a window size of 400 ms. The framed data is then processed and representative acoustic signatures are identified for the running vehicles (306). (For the real-time embodiment in FIG. 3, the acoustic signature or pattern is generally measured (e.g., extracted from information in the data frames) and compared with learned acoustic signatures as discussed in more detail with reference to FIG. 6.) Generally, for a running vehicle, it is determined first whether there is an approaching vehicle (versus, e.g., some other background sound) (308). If not, control may revert to the reception and framing of additional acoustic data (304). If so, it is next determined which class of vehicle is the subject of the identification (310). Thereupon, the recognition results, such as information sufficient to identify the vehicle class (which may in some cases be the identification of the vehicle class itself), may be sent to the central computer via a wireless transmitter or other means (312).

FIG. 4 illustrates a flow diagram of a central computer receiving results of an acoustic signature recognition. The central computer in one embodiment is central computer 217 located in command center 220 of FIG. 2. The central computer may receive the acoustic recognition results from the on-site sensor over a wireless receiver (414). The event is then localized (416), either to the on-site sensor that transmitted the recognition signal or, more specifically, to the location of the vehicle in the embodiment where an array of distributed microphones is used for localization. A response can thereupon be determined (418), such as creating a log of the event and, where necessary, slewing a camera in the direction of the area or the vehicle, triggering an alarm, contacting other authorities, activating a barricade, or performing another action.

Various specific methods for implementing the acoustic recognition system will now be described.

Figure 5A:
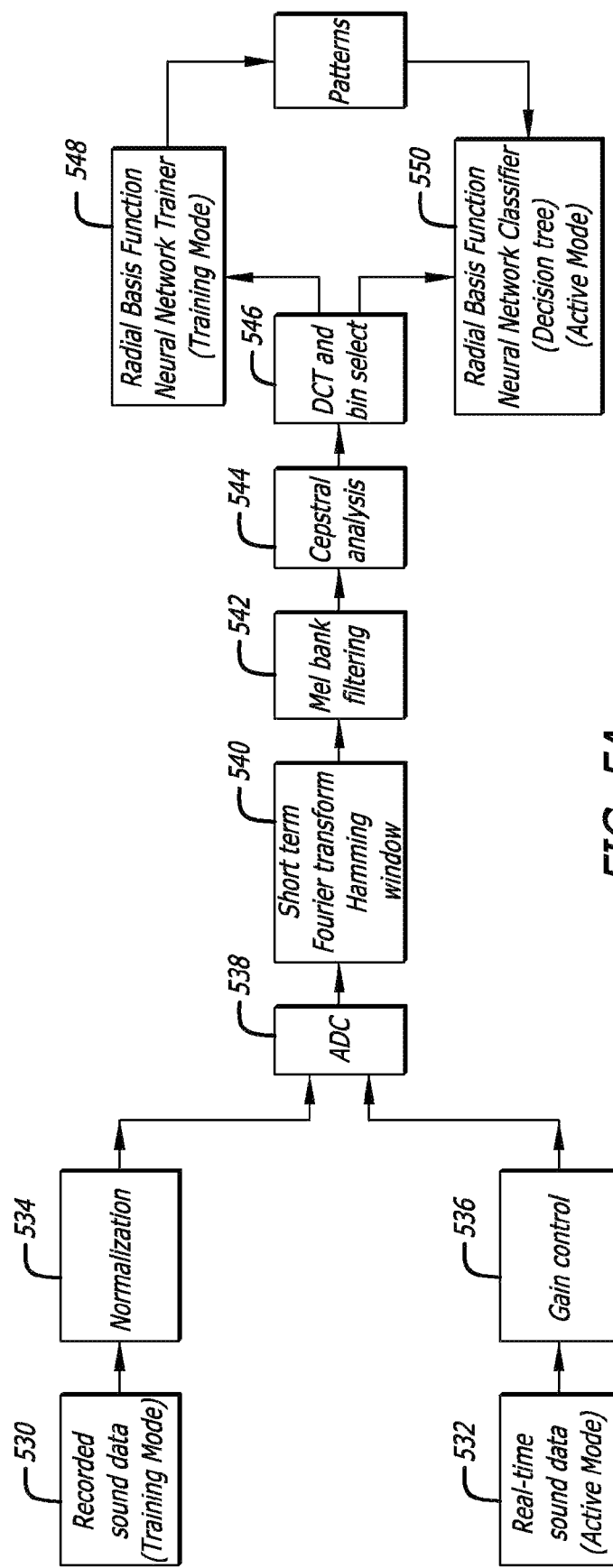
FIG. 5a illustrates a flow diagram of an exemplary method for recognizing acoustic waveforms of running vehicles using a radial basis function neural network trainer in accordance with the present disclosure.

FIG. 5a illustrates a flow diagram of an exemplary method for recognizing acoustic waveforms of running vehicles in accordance with an aspect of the present disclosure. FIG. 5a uses mel frequency cepstral computation (MFCC) as the feature extraction technology. MFCC is traditionally used in acoustic signal recognition such as speech or speaker recognition.

From boxes 530 and 532 it is shown that a training mode (also called a learning mode) and an active mode (also called a testing mode) may be implemented in the overall algorithm. Generally, in training mode, recorded sound data of vehicles or other sources are input into the system and, from those sources, representative acoustic information is extracted. The representative acoustic information is linked to the identity of the recorded vehicle or other source and stored. Generally in acoustic signal processing extracting representative features is an important element to characterizing the unknown signature of running vehicles. For the purposes of this disclosure, "vehicle source" refers to either recorded or real time data. While recorded data is often used in training mode, either recorded or real time data may be used in training mode. Subsequently, after the system has extracted representative acoustic signatures for the vehicle sources that will be the subject of the monitoring, then an active mode may be employed whereby sounds are recorded in real time. When a real time acoustic waveform has a pattern matching a stored pattern, then a match is found.

At 530, recorded sound data is input into the system. The absolute value of recorded sound data may be normalized (534). Similarly, in the active mode (when the system is activated for real world use), real time sound data is recorded in the area to be monitored (532) and amplified, in one embodiment using an adjustable gain amplifier as described further below (536). The information in both training and active modes is digitized (538) and divided into frames (540). In one embodiment, a Hamming window is used to divide signals into frames. The Hamming window is defined as follows:

$$w(n) = 0.53836 - 0.46164\cos\left(\frac{2\pi n}{N-1}\right) \quad (1)$$

A short-term Fourier transformation (STFT) is performed on the windowed data to determine frequency and phase information of the local sections of the signal.

Next, a cochlear-frequency based analysis is employed using band-pass Mel filterbanks (542). In one configuration of this embodiment, 40 band-pass filters are used over a frequency range of 20 Hz to 11.025 KHz. These filters map, onto the Mel scale, the log amplitudes of the spectrum obtained from the transformed windowed data using triangular overlapping filterbanks. In an ensuing Cepstral computation (544), the Mel frequency Cepstral coefficients constitute the mel-log amplitudes of the resulting spectrum in a manner that is understood in the art. These mel-log amplitudes are used to determine frequency variations of the input data.

The discrete cosine transform of the list of mel log amplitudes is then taken by approximating the list of mel log amplitude values as a signal, and a defined number of bins are selected (546). In one configuration, 20-40 bins are selected. Thereupon, when the system is in a training mode, signals are passed to the radial basis function neural network trainer (548), where different such networks are trained to represent patterns (552) such as several different classes of vehicles, as well as several normally occurring background noises. In an active mode, signals pass to a radial basis function neural network classifier (550), where the radial basis function neural networks may be used in parallel to make decisions such as whether the sound is that of a running vehicle, and if so, what type of vehicle. The decisions are based on comparing patterns of the sound recorded in the testing mode with the trained patterns (552).

In one embodiment, expectation-maximization method is used for training. Upon training algorithm convergence, different patterns are obtained for varying classes of vehicles and for non-vehicles. Real-time input wave data for vehicle and human voice are plotted in FIGS. 12(*a*) and 12(*c*). FIGS. 12(*a*) and 12(*c*) show examples of an acoustic waveform for a gasoline-run light-wheeled vehicle and a human voice, respectively. The y-axis represents amplitude and the x-axis represents time. From these figures, it is shown that background sometimes generates sounds with larger amplitude than vehicle's sounds. FIGS. 12(*a*) and 12(*c*) displays important and dramatic differences between vehicle and human voice patterns. Earth Mover's distance (EMD) may be used to compute pattern (with mean and variance) difference between various classes. The EMD between vehicle and human voice, for example is 425.76.

Upon being trained, the developed system in the active mode can both recognize the approaching vehicles and discriminate in which class the vehicle belongs. FIG. 12(*e*) illustrates an acoustic waveform of an exemplary gasoline heavy wheeled vehicle. Despite the similarity in the wave data of the two classes of vehicles as illustrated by FIGS. 12(*a*) and 12(*e*), the disclosed system is sophisticated enough to find the critical difference between these classes. FIG. 13 shows an example of a pattern comparison of acoustic data between the input data and trained patterns of the gasoline light and gasoline heavy vehicles. Each line represents a pattern of the respective class. This pattern has mean values at each pattern dimension. The error bar at each pattern dimension is the variance. The EMD between gasoline light and gasoline heavy wheeled car is 68.99.

In one aspect, a maximal-likelihood metric and a decision threshold are employed for making decisions in the active mode. When the probability of running vehicle is the largest and it is above a defined threshold, a positive result that there is an vehicle approaching is decided, with this decision subsequently being sent to the command center. In this metric, Mahalanobis distance is used as a distance measure. It is based on correlations between feature vectors by which different patterns can be identified and analyzed. It differs from Euclidean distance in that it takes into account the correlations of the data set and is scale-invariant. Formally, the Mahalanobis distance from a group of features with mean $\vec{\mu}$ and covariance matrix P for a multivariate vector $\vec{x}$ is defined as, $$D(\vec{x}) = \sqrt{(\vec{x}-\vec{\mu})^T P^{-1} (\vec{x}-\vec{\mu})}, \quad (2)$$

where P is diagonal matrix in the present system. Based on Gaussian kernel with Mahalonobis distance, the log probability difference between vehicles and background noises may in some embodiments be approximately 40~100 dB.

Figure 5B:
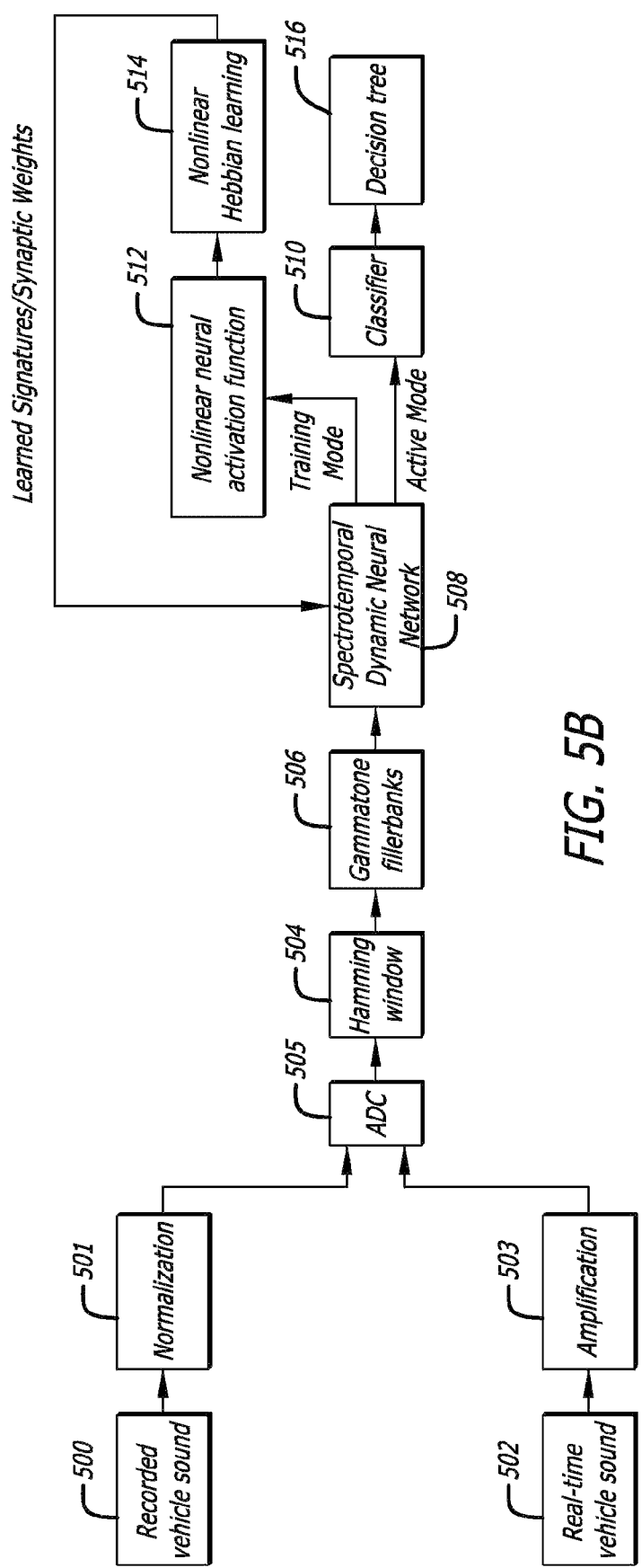
FIG. 5b illustrates a flow diagram of an exemplary method for recognizing acoustic waveforms of running vehicles using a spectro-temporal dynamic neural network trainer in accordance with the present disclosure.

FIG. 5b illustrates a flow diagram of an exemplary method for recognizing acoustic waveforms of running vehicles in accordance with an aspect of the present disclosure. As above, in training mode, recorded sound data of vehicles or other sources are input into the system and, from those sources, representative acoustic information is extracted. Thereupon, in an active mode, real time sound data is recorded, and acoustic patterns are measured and compared to the stored representative acoustic information. When a "match" is found, the source may be identified and the system responds as discussed above.

At 500, recorded sound data is input into the system. The recorded sound data is normalized (501). Similarly, in the active mode (when the system is activated for real world use), real time sound data is recorded in the area to be monitored (502) and amplified (503), in one embodiment using an adjustable gain amplifier.

In an alternative embodiment, the amplifier is configured such that the automatic gain controller (AGC) computes gain after gammatone filter processing. AGC may be operated on gammatone filtered spectral feature vectors (these vectors are discussed below). The mean of the current feature vector is updated based on previous mean and current feature value. The number N defines how many feature vectors (how long) the mean is updated. Then the computed mean is subtracted from the acquired data:

$$m_t = \frac{(N-1)m_{t-1} + s_t}{N} \quad (3)$$

The information in both training and active modes is digitized (505), and divided into temporal frames using a Hamming window. (504). The framed data may be filtered using band-pass gammatone filterbanks (506).

The information produced by the filtered signals represents spectral feature vectors of the frames. The spectral feature are vectors integrated over present and past frames to produce a spectral temporal representation (508) as described in greater detail below. In training mode, the integrated representation is input into a Hebbian Learning function (514) along with a nonlinear neural activation function (512), discussed with reference to FIG. 6, to produce a spectro-temporal neural network comprising representative acoustic signatures of the trained vehicle sources. In active mode, acoustic patterns from the real time waveforms (possibly along with other information) are compared to the known representative acoustic signatures (510). It is determine whether the sound represents a vehicle, and if so, the class of vehicle is identified (516).

In another aspect, linear Hebbian learning may be used to normalize variances of feature vectors. In this way, variance influences on some dominant elements may be attenuated. On the other hand, some variances calculated by LHL are very small. When these values are used for normalization, their corresponding elements would become very big, and thus make the system unstable. It is necessary to choose dominant variances for normalization, while others do not change. In order to select dominant variances, based on LHL convergence theory, these variances are actually eigenvalues of data correlation, and their corresponding basis vectors are eigenvectors. If the variance (eigenvalue) is dominant, its corresponding eigenvector is also dominant, and follows orthogonal condition. This condition may be used in practical real-time processing. When the LHL-learned synaptic weight vector is orthogonal with itself, the extracted variance is dominant.

FIG. 6 shows a more detailed flow diagram of a method for recognizing acoustic waveforms of running vehicles using a spectro-temporal dynamic representation and Nonlinear Hebbian learning in accordance with the present disclosure. For simplicity, both the training mode and the active mode will be described concurrently, although in many cases and depending on the configuration, only one of the two modes may be active. As in FIG. 5, in a training mode, a recorded vehicle sound or other sound for training purposes (e.g., bird chirp, human voice, etc.) may be input into the system (step 604) and normalized (step 608). In the active mode, an acoustic waveform corresponding to a source (such as an approaching vehicle with or without attendant environmental sounds) is captured (step 602) by the microphone in the area to be monitored (FIGS. 1-2) and converted into an electrical signal, which is amplified by an adjustable gain pre-amplifier (step 606).

The steps performed in FIG. 6 by processing system 210 may be implemented in any known computer language, or using a digital signal processor or other dedicated hardware. In a test embodiment, the inventors have used Matlab and C/C++.

After each signal is digitized (step 610), the signal is divided into temporal frames (612). A Hamming window may be used to divide the signal into frames with duration on the order of tens of milliseconds, such that the signal within the window could be assumed to be stationary and thus suitable for the following short-term frequency analysis. In one embodiment, on-line recorded data is framed with window size 400 ms, and overlapping size 100 ms.

Gammatone Filtering (GTF)

Figure 8:
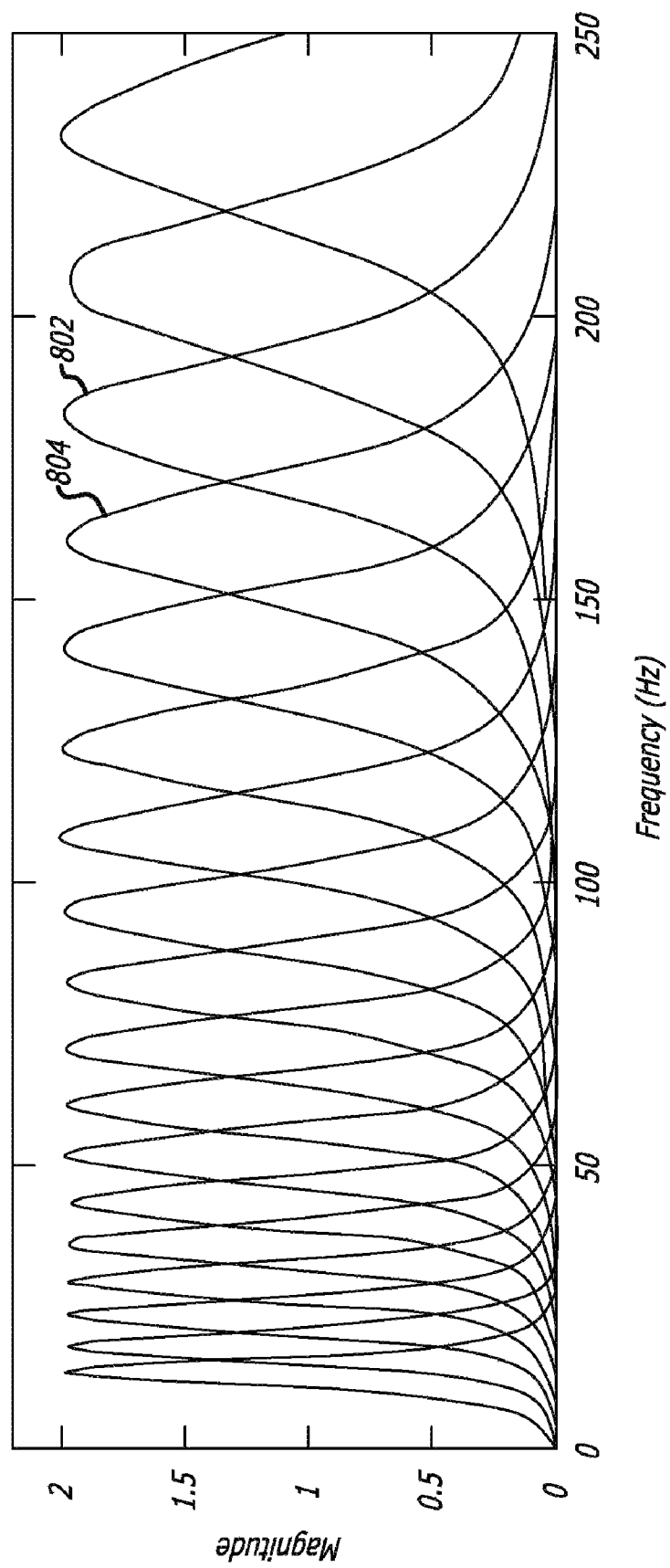
FIG. 8 illustrates an example of a plurality of gammatone filterbanks.

In step 614, the frames of the signal are filtered using a bandpass filter to extract short-term spectral features of the acoustic waveform from each frame. In one aspect of the disclosure, bandpass auditory gammatone filterbanks (GTF) are applied to process these frames to produce spectral feature vectors for each filtered frame. In one implementation, via gammatone filter processing, a spectral feature vector is computed for each frame. Gammatone filterbanks capture more spectral nonlinearities than traditional methods. GTF is particularly well-suited to extract representative spectral features from the frames because it is representative of the physiological impulse response of mammalian primary auditory fibers, and hence well represents the cochlear impulse response of the auditory system. The impulse response of GTF is:

$$f(t)=t^{n-1}e^{-2\pi bt}\cos(2\pi f_c t+\phi) \quad (4)$$

where n is the filter order, b represents the filter bandwidth, $f_c$ denotes the center frequency, and $\phi$ represents the tone phase. The bandwidth of the filter depends on the center frequency and is described by an equivalent rectangular bandwidth (ERB)

$$b(f_c) = 1.019 \times 24.7\left(1 + \frac{4.37 f_c}{1000}\right) \quad (5)$$

where 1.019 is the correction factor. In order to derive the transfer function of analog gammatone filter, impulse invariant transformation may be applied, which is shown to have a smaller digital implementation error than other transformation methods. As gammatone filters can extract more features at various levels of nonlinearities than other conventional feature extraction approaches, such as Mel filterbanks, it can thus achieve better performance under noisy environments. FIG. 8 illustrates an example of a plurality of gammatone filters (e.g., 802 and 804).

Like 133 Hz being selected as the lowest frequency of filterbanks for speech recognition, the lowest frequency value generally affects the filterbanks, and then the covering range and magnitude of spectrum. Filterbanks with different lowest frequency values provide different spectral features, some of which may match better with vehicle spectrum than others. Therefore, depending on the application, some of them may extracted more useful spectral information than others. In one embodiment, the inventors have selected 0, 30, 50, 100, 150, 200, 250 Hz as the lowest frequency values, respectively. With each lowest frequency value selected, GTF+STR+NHL algorithms may be processed, and a set of trained patterns may be obtained. These trained patterns can provide almost the same recognition results when vehicle data in normal circumstances is analyzed. When vehicle data is mixed with additive white Gaussian noise (AWGN) at SNR=0 dB, their responses are generally different. In some embodiments, the patterns trained with the lowest frequency value 30 Hz may provide a better performance than others, although the invention is not intended to be restricted to any particular set of frequency parameters.

Spectro-Temporal Representation (STR)

In traditional acoustic recognition approaches (e.g., using MFCC), consecutive feature vectors of relatively short temporal length (e.g., tens of milliseconds) are used as independent inputs. However, these spectral feature vectors are sensitive to background noise or channel distortion, and they are correlative along time. Further, physiological studies of the mammalian auditory cortex have determined that neurons in the brain process both time and frequency components of signals, and the temporal receptive field is extended up to the order of hundreds of milliseconds. Accordingly, in another aspect of the disclosure, a spectro-temporal representation is established by collecting and integrating multiple frames of gammatone filtered spectral feature vectors (step 616). The multiple temporal frames of spectral vectors are integrated on the order of hundreds of milliseconds or more (see FIG. 9). In one embodiment, multiple frames of collective duration at least 200 ms or more are used.

More specifically, the incoming acoustic waveforms are generally non-stationary through consecutive feature vectors. The response of the system at the present time depends not only on the current input feature vector, but also on the past ones. The spectro-temporal representation includes both the present feature vector and the past ones. Integrating acoustic information over the long term to produce a spectro-temporal representation can greatly attenuate the drawback of short-term spectral features associated with conventional approaches to generic acoustic signal recognition problems wherein the short-term spectral features are due to the sensitivity to changes in the aforementioned acoustic environments such as background noise or channel distortion. Hence, by incorporating features in both domains (rather than just a spectral analysis), performance is superior than previous approaches. The spectro-temporal representation is used as an input for the learning process discussed below to extract a representative acoustic signature therefrom.

Figure 9A:
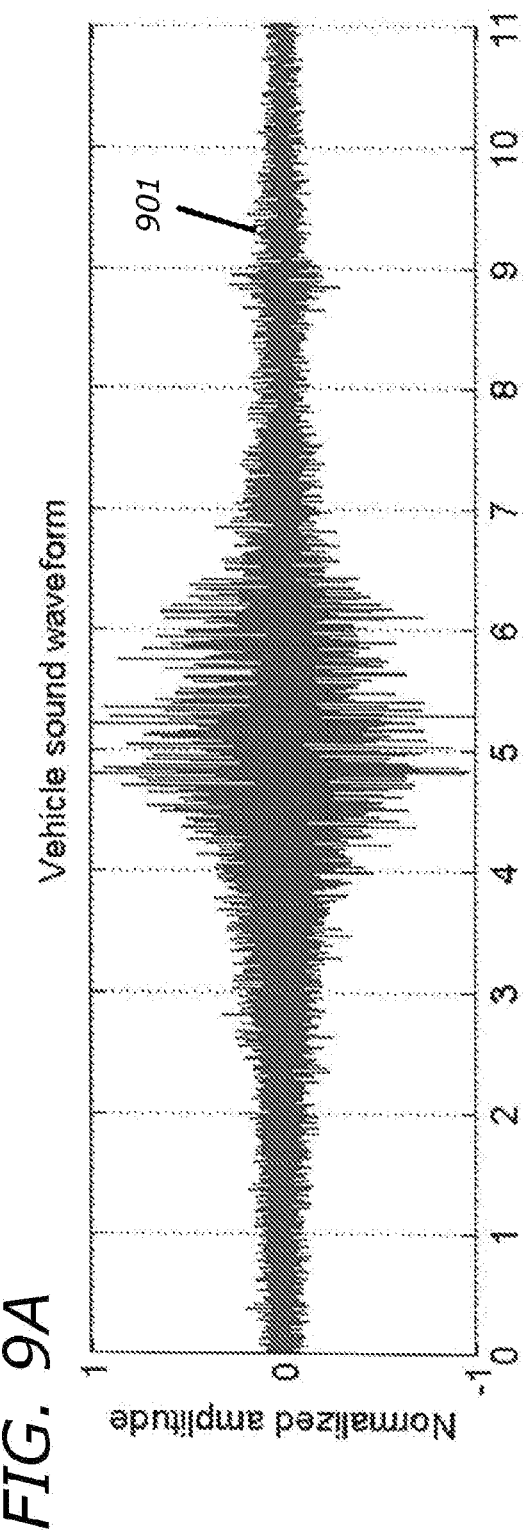
FIG. 9 illustrates an example of a spectro-temporal representation of a vehicle waveform.
Figure 9B:
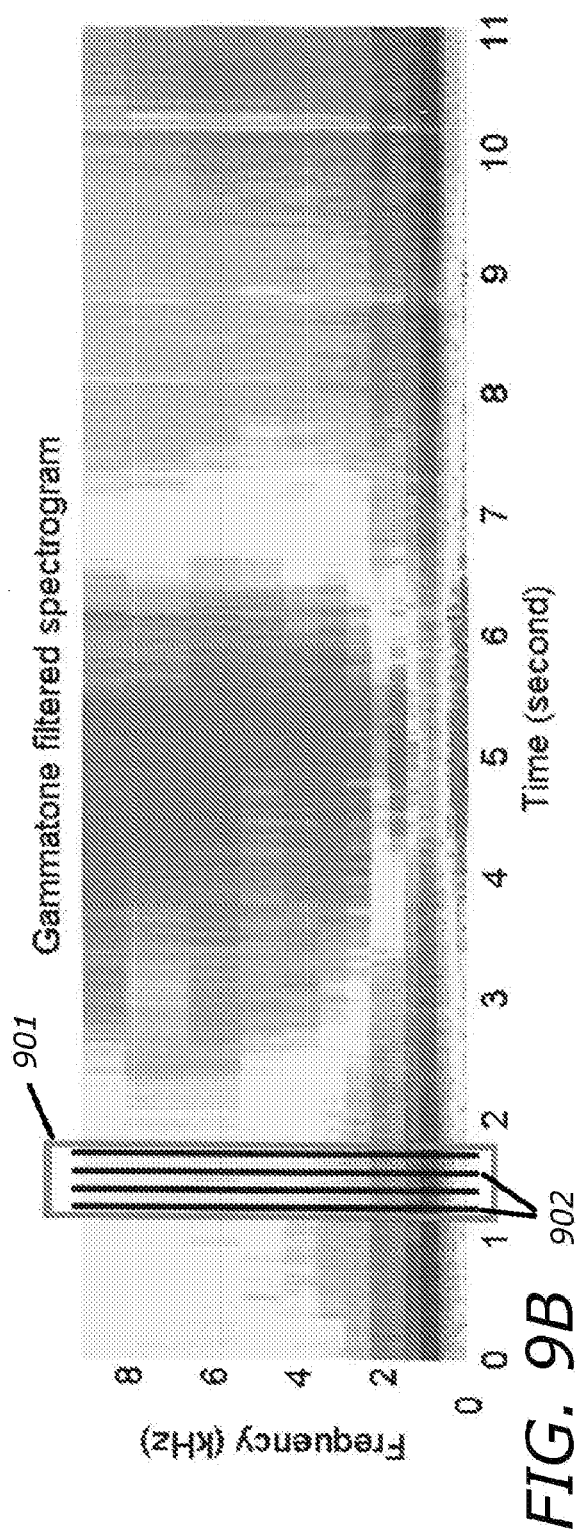

Referring to FIG. 9A, vehicle waveform 901 is shown. The horizontal axis represents time in seconds, and the vertical axis represents normalized amplitude. Waveform amplitude is normalized based on the recording microphone and amplifier used. Short-term frame size in the illustrated embodiment is 20 ms, and overlapping is 10 ms. FIG. 9B shows one illustration of a gammatone filtered spectro-temporal representation. The spectral information is coherent over a long-term field, on the order of hundreds of milliseconds. Each thick vertical line 902 represents a gammatone filtered spectral feature vector. The rectangle 901 represents a plurality of spectral feature vectors. In one embodiment, the information contained in the rectangle 904 represents the input at a given time to the following learning function.

Nonlinear Hebbian Learning (NHL)

In another aspect, a modified nonlinear Hebbian learning (NHL) function for extracting an unknown acoustic signature of the running vehicle sound is described. Together with STR and GTF, NHL is used to generate a spectro-temporal dynamic neural network of learned acoustic signatures. NHL is motivated by neural learning functions in the human brain. The inventors have found NHL to be particularly effective at extracting acoustic signatures in the presence of unknown noise in a signal, or noise that is highly time varying, or where the mixture between a signal of interest and noises is generally unknown. Herein it is disclosed to modify the computations of nonlinear Hebbian learning. Furthermore, to incorporate the time delayed feature vectors into the operation of a dynamic neural network, each time delayed input is assigned a synaptic weight.

At step 622, values obtained from the integrated spectro-temporal representation are input into a NHL function to adaptively learn the acoustic signature (i.e., pattern) of the running vehicle. Concurrent to this process, in another aspect, synaptic weights—i.e., the weight matrix that projects the incoming signals onto the representative feature space of vehicle sound and thereby transforms input to output—may be adaptively learned (step 621). In this embodiment, the input comprises the spectro-temporal feature vectors as discussed above, and the output during the training mode comprises the resulting acoustic signatures. During the training mode, the outputs (acoustic signatures) are computed using equation (6) (below), and the weight matrix is computed using equation (7) (below).

During the active mode, for an unknown waveform recorded (for example, in real time), after using gammatone filterbanks (step 614) and spectro-temporal representation (step 616), the trained matrix of learned synaptic weights projects the spectro-temporal input to the vehicle feature space, and obtain tested outputs that characterize the acoustic source. Then the tested outputs (measured acoustic signatures or measured acoustic patterns) are compared with trained outputs (learned acoustic signatures) to determine the levels of similarity between the measured acoustic pattern and the trained acoustic signatures. If a level of similarity is determined above some predetermined threshold, a vehicle classification may result as discussed below. Otherwise, the tested output may be classified as noise, or, in other embodiments, another source.

In addition, during training mode, control may be returned to step 616 (or, in other embodiments, prior steps), where a new spectral feature vector is integrated with past feature vectors to produce a new integrated spectral representation, thereby allowing the NHL to iteratively learn and improve the extracted acoustic signatures over time and thereby enhance the spectro-temporal dynamic neural network. Thereupon, the learned synaptic weights and acoustic signatures obtained for varying classes of vehicles may be used as inputs to a supervised associative neural network at the testing stage (step 624).

There is strong physiological evidence for Hebbian learning in the area of the brain called the hippocampus. The hippocampus plays an important role in certain aspects of learning or memory. This physiological evidence makes Hebbian learning all the more appealing. Linear Hebbian learning (or generalized linear principal component analysis) only considers second-order moment of input data. In terms of information-theoretic context, the second-order moment is inadequate to reduce data redundancy, as generally the mutual information between important independent components involves statistics of all orders. Nonlinear Hebbian learning is a great advance over linear Hebbian learning as the nonlinear contrast function takes implicitly higher-order statistics into account, instead of just second-order variance criterion in linear Hebbian learning.

The dimension of spectro-temporal features generally is up to the order of hundreds, which causes very complex computation at the testing stage if they are used as patterns. Besides, high-dimensional features normally confuse real representative features as high-dimensional ones are often mixed with unrelated noises. To manage the complexity of dimensionality in the proposed system, a nonlinear Hebbian learning is used to project this high-dimensional representation to a low-dimensional subspace that captures important features while rerunning unimportant ones.

The Nonlinear Hebbian learning iteratively updates neuron output patterns and synaptic weights as the following two steps. Upon convergence, representative independent features $\{y_l\}_{l=1}^{L}$ can be extracted:

Step I) Neuron Output Computation:

$$y_l = \sum_{q=1}^{Q} \sum_{m=1}^{M} w_{qml} x_{qm}, \, l \in [1, L]; \tag{6}$$

Step II) Synaptic Weight Update:

$$\Delta w_{qml} = \eta g(y_l) g'(y_l) \left( x_{qm} - \sum_{i=1}^{l} w_{qmi} y_i \right), \tag{7}$$

$$q \in [1, Q], m \in [1, M], l \in [1, L];$$

where Q and M are the number of spectral bins and temporal frames, respectively. L is the number of extracted representative output patterns. $w_{qml}$ represents the connecting spectro-temporal synaptic weight from input neuron $x_{qm}$ to output neuron $y_l$. The nonlinear activation function g(.) is the critical part in nonlinear Hebbian learning which explores high-order statistics of input signals.

As noted above, from the perspective of statistical pattern recognition, nonlinear Hebbian learning provides an effective technique for dimensionality reduction. The signals are mapped from space $x \in R^{Q \times M}$ to space $y \in R^L$ with $L \ll Q \times M$.

The specific nonlinear Hebbian learning (NHL) method according to this aspect of the invention differs from traditional approaches in at least two ways. First, the real extracted output (signature) here is y rather than z as in prior approaches. Of concern is the acoustic signal recognition of one-class data, rather than the multi-class clustering that was the subject of earlier approaches. Those earlier approaches are not ideal for noise-robust pattern recognition because, among other reasons, they may cluster noises close to 1 or −1 point. Second, the nonlinear activation function is chosen based on the implicit acoustic signal distribution. Traditional approaches focus on big-gap boundary issue in the clustering problem, and outliers may be closely centered with signals of interest.

Nonlinear Neural Activation Function

Which representative components are picked up depends both on the activation function and on the implicit signal distribution. The NHL is unsupervised learning, which does not assume any knowledge of component distribution or composing property. Nevertheless, some prior knowledge about acoustic data distribution. It is hypothesized that general acoustic sound is approximately super-Gaussian distributed, with higher peak and longer tail than Gaussian distribution. In order to provide a more stable learning, it is better to choose an activation function that considers some inherent property of data distribution. When the slope of the activation function can be aligned with the high density portion of the input distribution, the mutual information of input and output is optimized.

Considering the general requirements for an activation function, and regarding the implicit statistics of acoustic data, we format $$g(y) = \frac{\gamma(\alpha, \beta y)}{\Gamma(\alpha)}, \, y > 0 \text{ where} \tag{8}$$

$$\gamma(\alpha, \beta y) = \int_0^y \tau^{\alpha-1} e^{-\tau} d\tau, \text{ and} \tag{9}$$

$$\Gamma(\alpha) = \int_0^\infty \tau^{\alpha-1} e^{-\tau} d\tau. \tag{10}$$

α denotes the shape, 1/β represents the scale and slope. This gamma cumulative function belongs to super-Gaussian class. And its derivative function is $$g'(y) = y^{\alpha-1} \frac{\beta^\alpha \exp(-\beta y)}{\Gamma(\alpha)}. \tag{11}$$

It can be proven that this function can be Taylor expanded in terms of all-order polynomials of data, which is crucial for the optimization of nonlinear Hebbian learning.

Figure 10:
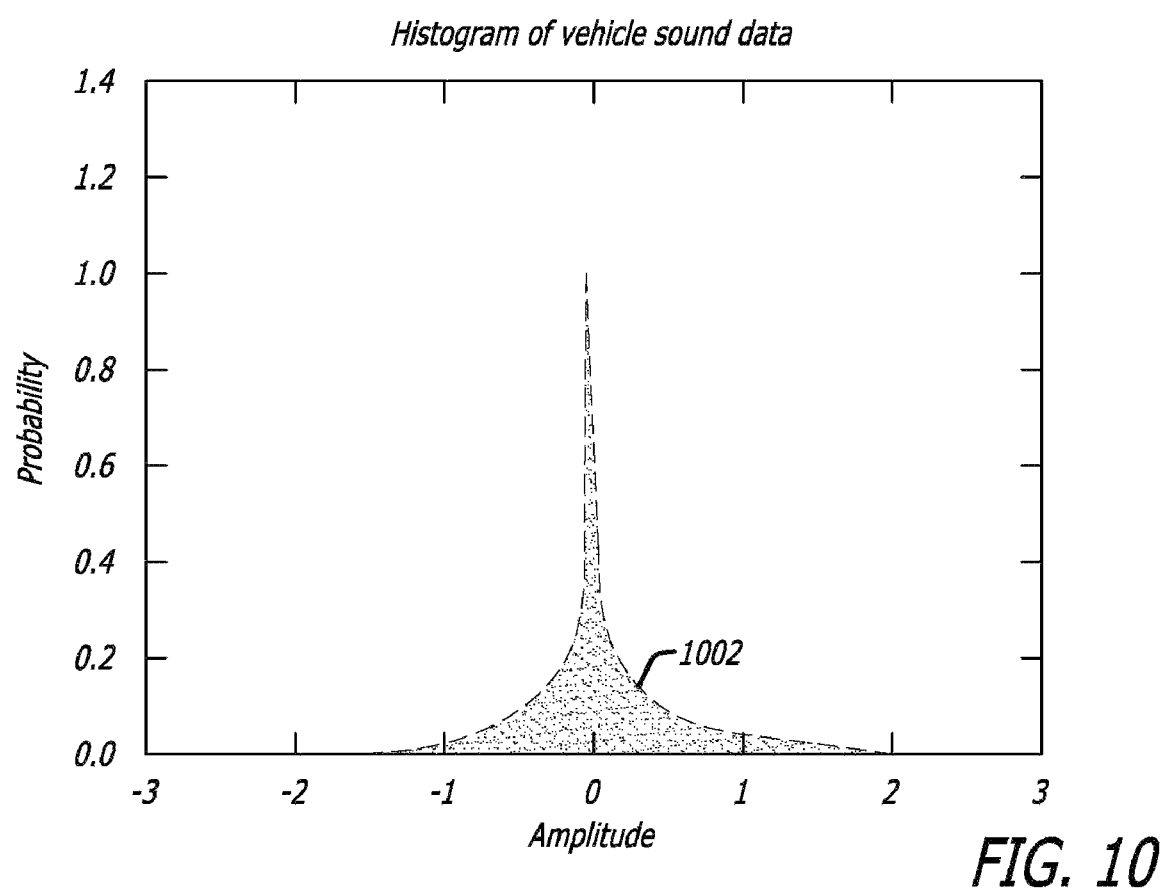
FIG. 10 illustrates an exemplary histogram of vehicle sound data.

FIG. 10 shows an exemplary histogram of vehicle sound data. Gaussian-distributed data is described with mean and variance, so linear Hebbian learning is a good tool for feature extraction of Gaussian data. On the other hand, gamma-distributed data cannot be described with just mean and variance, and thereby linear Hebbian learning that only explores second-order moment of data is not adequate for vehicle signal processing. Efficiently, the proposed super-Gaussian based integral transformation, cumulative gamma function 1002, behaves like a probabilistic filter for vehicle signals during nonlinear Hebbian learning. This transformation helps escaping of early trapping from pre-matured saturation, and significantly distinguishes itself from its counterparts as it favors the input components regarding their inherent statistical distribution.

Referring back to FIG. 6, for waveforms obtained in active mode 620, the source of the waveforms is classified using the supervised associative neural network (step 626). In this step, data from the spectro-temporal representation may be input into a supervised associative neural network compared with the learned acoustic signatures for classification. The synaptic weight matrix transforms the tested outputs to produce the measured acoustic patterns. In one embodiment, a radial basis function neural network is employed as the associative network from which the learned data is compared with the measured acoustic patterns. The measured acoustic patterns are compared with the acoustic signatures in order to classify the waveform in a manner described below.

Based upon these comparisons, a two-tier analysis is conducted in accordance with another aspect of the present disclosure. First, it is determined whether the source constitutes a running vehicle (step 628). In the event the source is something other than a running vehicle, such as a background noise source (e.g., human voice), control may return to step 602 to monitor in the active mode for additional sounds. Otherwise, if the source is identified as a vehicle based upon a determined match of the measured acoustic signature with a learned acoustic signature within a predetermined margin of acceptability, the class of vehicle is identified (step 630). In light of the favorable aspects of the present disclosure, the recognizer is able to identify real-time vehicle sound that may be co-sensed with background noise. The results of the determination, such as the time of the detection and the identity of the vehicle class, may thereupon be transmitted to the command center for further processing as described above.

Radial Basis Function Neural Network

Figure 11:
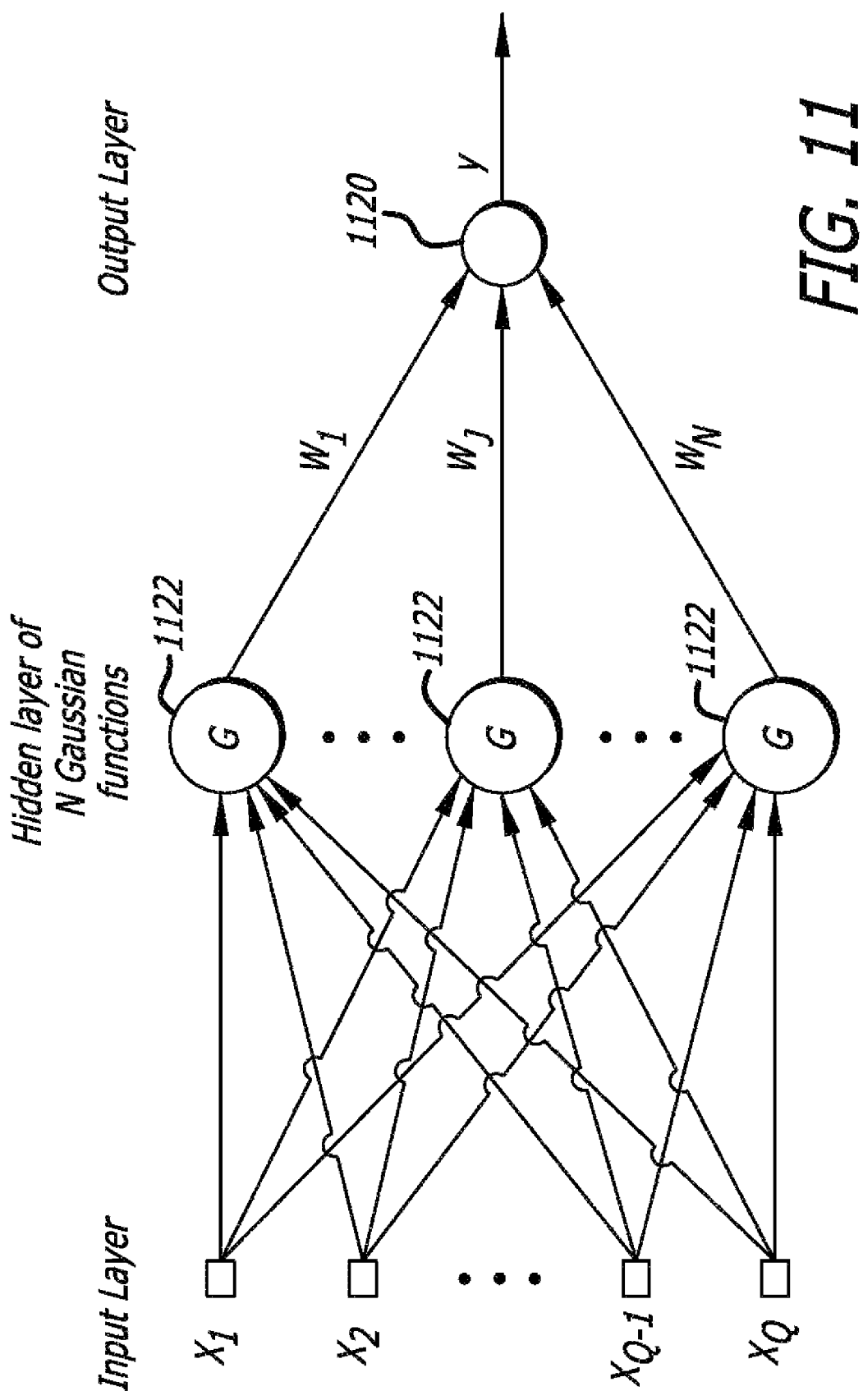
FIG. 11 illustrates an example of a radial basis function neural network.

As described above, in one aspect a radial basis function neural network is used as part of the classifier in comparing the patterns of real time signals with the learned acoustic signatures to identify the source. With reference to FIG. 6, for example, classification step 626 may be performed using a radial basis function neural network as follows. In the active mode, for an incoming unknown waveform, after gammatone filtering (614) and spectral-temporal integration (616) are performed, the spectro-temporal vector input may be transformed by the weight matrix into transformed outputs (measured acoustic patterns or measured acoustic signatures). As shown in FIG. 11, the transformed outputs are used as the inputs $x_1, x_2 \ldots x_Q$ of radial basis function neural network. The learned acoustic signatures represent patterns with mean and variance. These acoustic signatures are saved in the radial basis function neural network as Gaussian kernels 1122 (FIG. 11). Radial basis function neural network thereupon computes an output y based on the inputs $x_1, x_2 \ldots x_Q$ and functions 1122. In an exemplary embodiment, the output y is a single value 0.2. A predefined threshold representing the presence of a vehicle is 1.0, and a predefined threshold representing noise is 0. In this illustration, because 0.2 is closer to 0, the unknown waveform is classified to be noise. It will be appreciated that the output computation and threshold selection mechanism and criteria may vary depending on the specific configuration.

Figure 7:
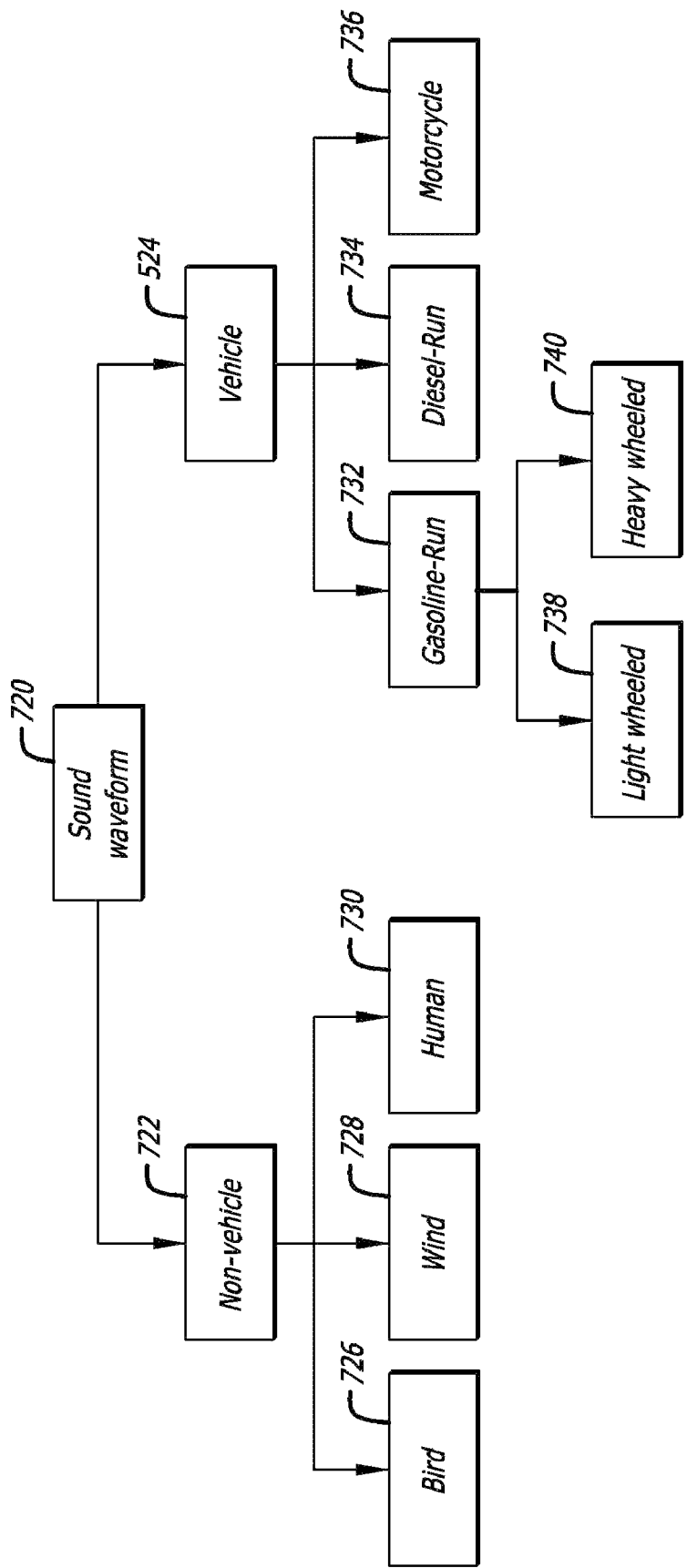
FIG. 7 illustrates a flow diagram of an exemplary decision tree showing different vehicle classes in accordance with the disclosure.

FIG. 7 illustrates a flow diagram of an exemplary decision tree showing different sound sources that may be recognized in steps 628 and 630 of FIG. 6. For each leaf node (e.g., each vehicle type 732, 734, 736), in one embodiment, a set of acoustic signatures and one weight matrix are learned in the training mode. Thus, for each leaf node there is a matching radial basis function neural network with several Gaussian kernels. Exemplary sound waveform 720 may be a non-vehicle sound 722 or a vehicle 724. Non-vehicle component 722 may be further classified into a bird chirp 726, wind 728, human voice 730, or another type of sound (e.g., thunder, footsteps, ordinance, etc.). Vehicle component 724 may be classified into gasoline light track (light wheeled) 738, gasoline heavy track (heavy wheeled) 740, diesel (734), and motorcycle (736). Other classifications are possible.

In one embodiment during active mode for vehicle identification, an incoming waveform may be processed in a parallel way in four radial basis function neural networks. The maximal result from one out the four is then chosen.

FIG. 11 illustrates an example of a radial basis function neural network that can be used to represent the nodes described with reference to FIG. 7 above. One-to-one correspondence between the input data $x_1$-$x_Q$ and the Gaussian function G (1122) produces a regularization network. In general, the number of Gaussian functions N is smaller than the number of frequency bins Q, thus satisfying the requirement of mapping and reducing the original input data to a feature space with fewer free degrees. According to this description, the output is expanded on a finite set of nonlinear bases $$y = \sum_{n=1}^{N} w_n G_n(\vec{X}) \tag{12}$$

where $G_n(\vec{X})$ is a multivariate Gaussian function with different mean $\vec{\mu_n}$, and variance $P_n$ with respect to varying n values.

$$G_n(\vec{X}) = \exp\left[-\frac{1}{2}(\vec{x} - \vec{\mu_n})^T P_n^{-1} (\vec{x} - \vec{\mu_n})\right] \tag{13}$$

Figure 12A:
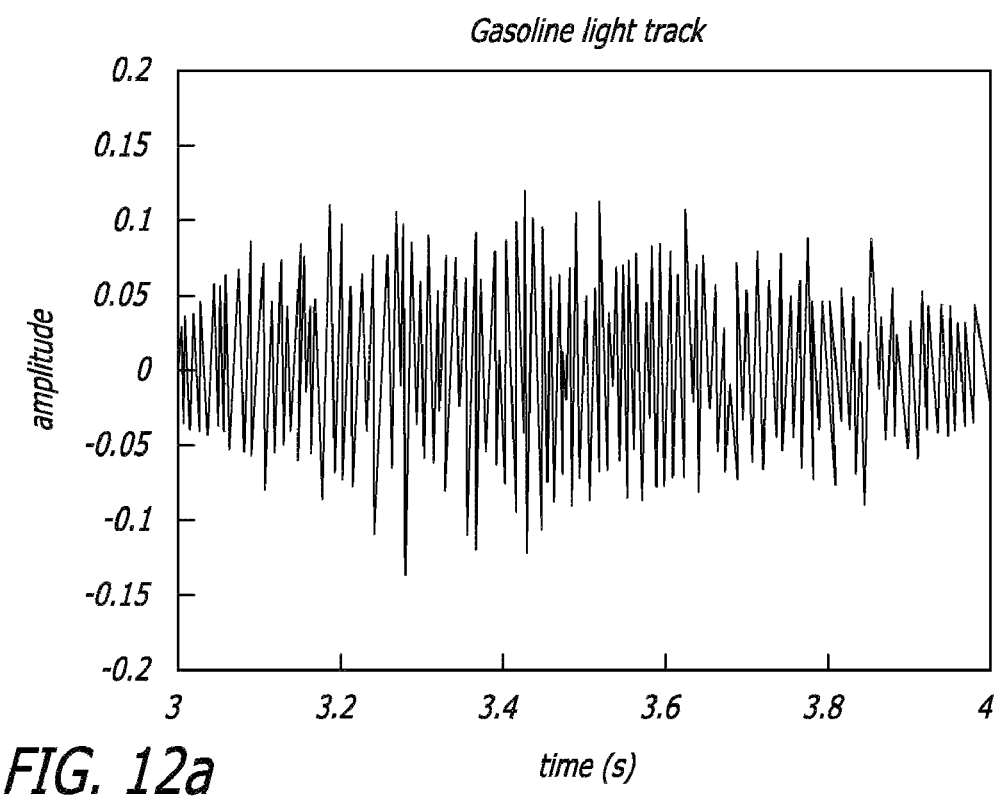
FIGS. 12(a), 12(c) and 12(e) illustrate acoustics waveforms of an exemplary gasoline light-wheeled vehicle, a human voice, and a gasoline heavy-wheeled vehicle respectively.
Figure 12B:
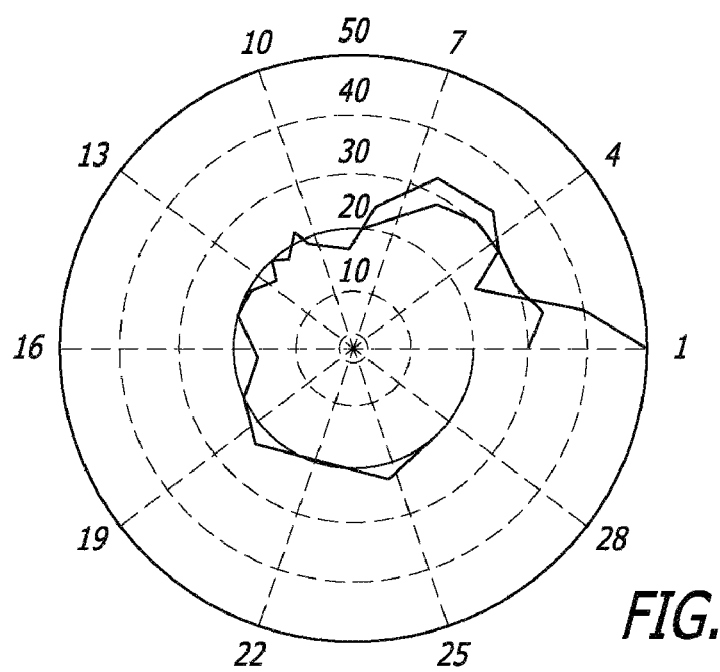
FIGS. 12(b) and 12(d) illustrate exemplary radial basis functions of the exemplary gasoline light-wheeled vehicle and human voice, respectively.
Figure 12C:
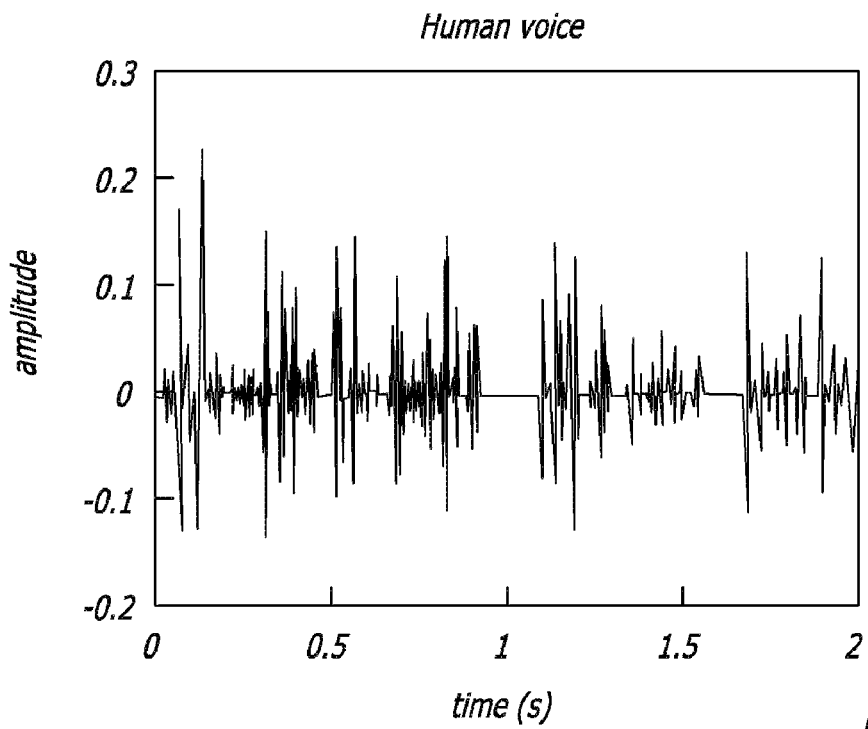
Figure 12D:
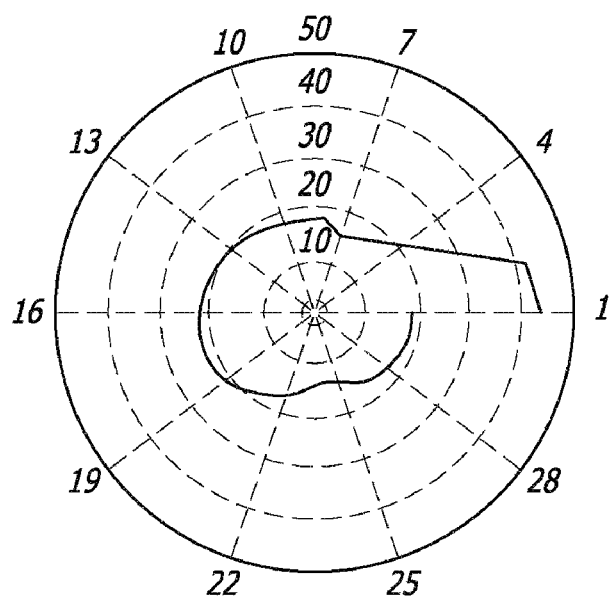
Figure 12E:
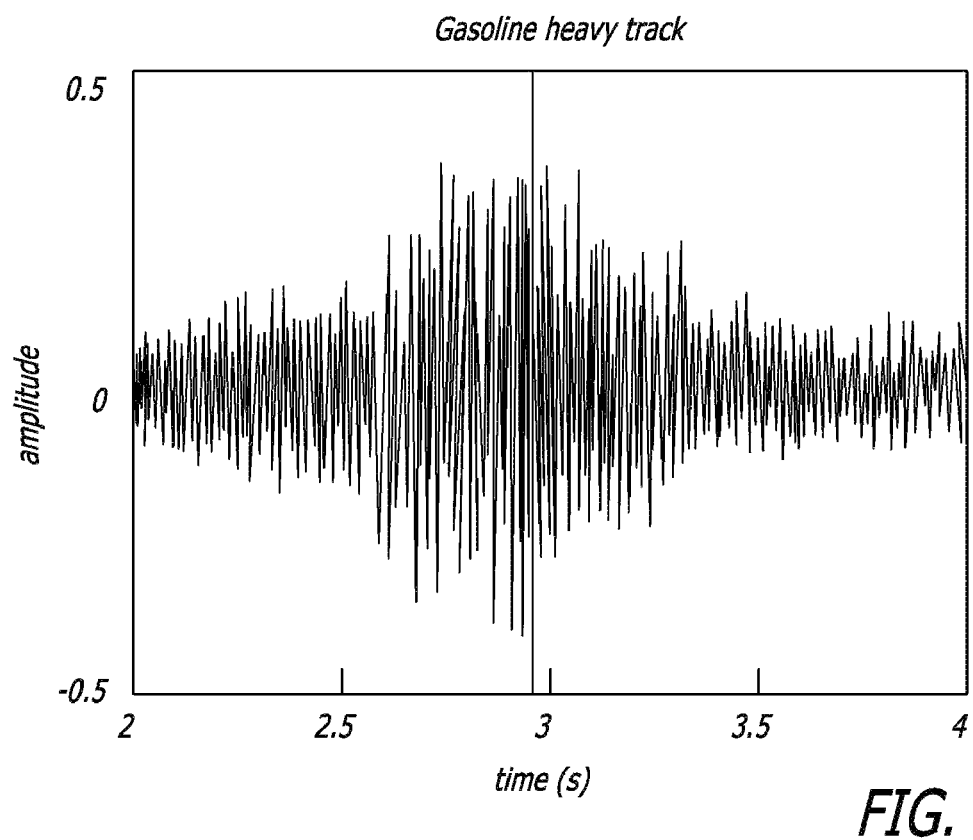
Figure 13:
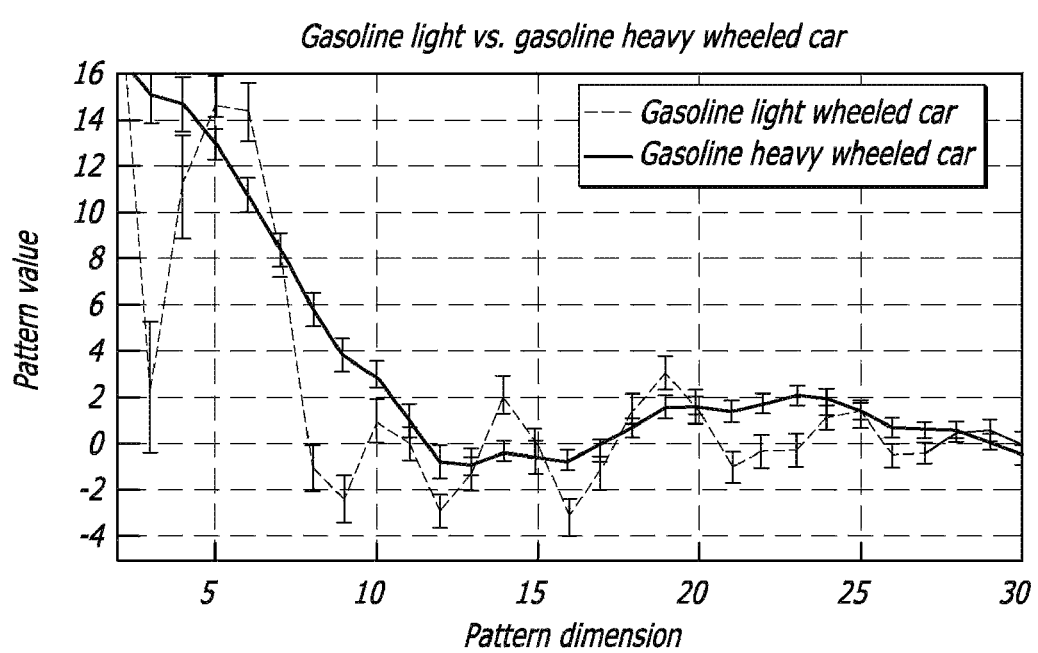
FIG. 13 illustrates an example of a graph comparing acoustic input data and trained patterns of a vehicle and a human voice.

FIGS. 12(b) and (d) show examples of a radial basis function of the gasoline light wheeled vehicle and human voice of FIGS. 12(a) and (b), respectively. These polar shaped figures are mean values plotted from the trained pattern vectors (i.e., the learned acoustic signatures). FIG. 12(b) shows two trained curves pattern, each representing the gasoline light wheeled vehicle class. FIG. 12(d) shows one trained curve (pattern) representing human voice. In a practical system, a plurality of patterns may be used for each class.

Test Results

In tests of an embodiment of the proposed system of FIG. 5B, the recognizer was able to make two-level decisions. First, to recognize urban vehicle (generalized urban vehicles in city environments) and reject non-vehicle (human voice, bird chirp, and wind); and second, to decide which type the vehicle is: gasoline light wheeled car, gasoline heavy wheeled car, heavy truck, and motorcycle. The road conditions were paved and sandy. The sensor (microphone) was set 3 to 7 meters away from the road. Height of the microphone was 0 to 3 meters. Ten minutes of data for each vehicle type was used for training mode. Another six minutes of data for each vehicle type was used for testing in the active mode.

In the non-vehicle class, five minutes bird chirp was provided from a dataset of North American bird sounds. The short-term frame size was 20 ms with 10 ms overlapping, the sampling rate was 22,050 Hz, and the gammatone spectral range was 50 to 11.025 KHz. Q=30 was selected in order to cover enough high-frequency subbands within this spectral range. M=20 indicates 200 ms ((20−10)×20=200) receptive field to explore temporal dynamics. L=15 was chosen based on a coarse estimation of the number of dominant signatures.

Using LHL for sphering, input features were shifted by the mean and normalized by the variance. To provide a stable and fast NHL, the learning rate was set at 0.01 for the first ten iterations. The rate was then decreased by multiplying a factor 0.7 every ten iterations to stabilize the learning procedure. Convergence was decided when the synaptic weight vectors were orthogonal and the synaptic weight change is less than $10^{-4}$ over two consecutive iterations. In the tested system, for about 400 iterations the unsupervised learning of synaptic weight converges. The converging time using Intel® Core 2 Duo Processor at 1.8 GHz was between 5 and 10 minutes.

Vehicle Vs. Non-Vehicle Recognition Under Noisy Environments

The comparing metric is error rate, which is the summation of false alarm rate and false negative rate. MFCC has been viewed as a baseline spectral feature extraction technology. Performance of the disclosed algorithm was compared with MFCC. Further, the proposed system was also compared with linear principal component analysis (or equivalently LHL), a traditional technology for vehicle recognition.

For real-world testing, there are many unexpected noises emitted by surrounding backgrounds. Both vehicle sounds and noises may be co-sensed by a microphone. Hence, the incoming data would be mixtures of vehicle sounds and noises. The proposed system does not assume any knowledge of noise sources or mixing property. But it can project noisy data into the feature space of vehicle sounds, in which noises are weakened. To mimic the situation when incoming signals are mixtures of vehicle sounds and other noises, clear vehicle data was added with either white or colored noises at various SNRs. The clear data recorded under normal environments had SNR 20~30 dB. SNR range −10~20 dB was selected to represent noisy environments. AWGN (similar to wind), human vowel, and bird chirp were used as noise examples.

Figure 14:
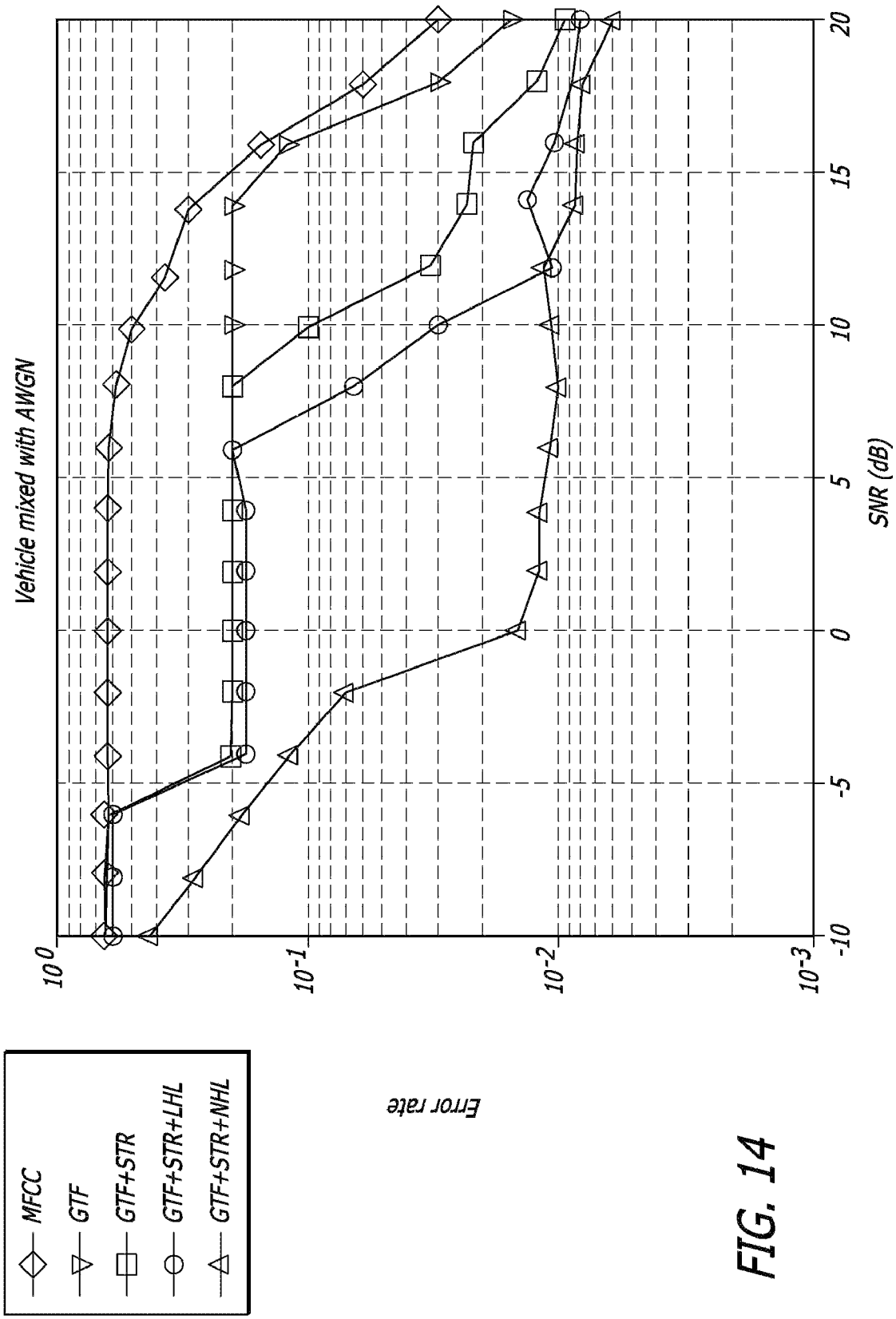
FIG. 14 illustrates a graph comparing the error rates of acoustic recognition systems using Mel frequency Cepstral computation (MFCC) and various combinations of each of gammatone filtering (GTF), spectro-temporal representation (STR), linear Hebbian learning (LHL), and nonlinear Hebbian learning (NHL) based on input waveforms of vehicles mixed with additive white Gaussian noise.

Firstly, without the knowledge of noise source or mixing property, the proposed system was tested to determine capability of attenuating AWGN effects on vehicle sounds. Recognition results are given in the comparison graph of FIG. 14. Results confirmed that GTF (gammatone filterbanks) were superior to MFCC (mel frequency cepstral computation). For example, when SNR=−5~10 dB, the error rate was decreased from 62% to 20%. Using STR (spectro-temporal representation) can improve system performance further; when SNR=12 dB, the improvement is 16.5%. Next, using LHL (linear Hebbian learning, or equivalently, PCA) can improve the performance, while NHL (nonlinear Hebbian learning) can more significantly improve it. At very low SNR=−10 dB, LHL had error rate 58%, while NHL decreased it down to 42% with 16% improvement; at low SNR=0 dB, LHL had error rate 17%, while NHL decreased it down to 1.7% with 15.3% improvement. In the SNR range 0~10 dB, NHL averagely improved the performance by 18.5% over STR. In all, at low SNR range from −10 to 0 dB, the error rate of the proposed system was decreased from 42% to 1.7% when the error rate of normally used MFCC is 62%. Then, the error rate of the proposed system stayed low at 0.7~1.5% until SNR=20 dB. This nearly plateau indicates NHL had effectively separated signals of interest from noises.

Figure 15:
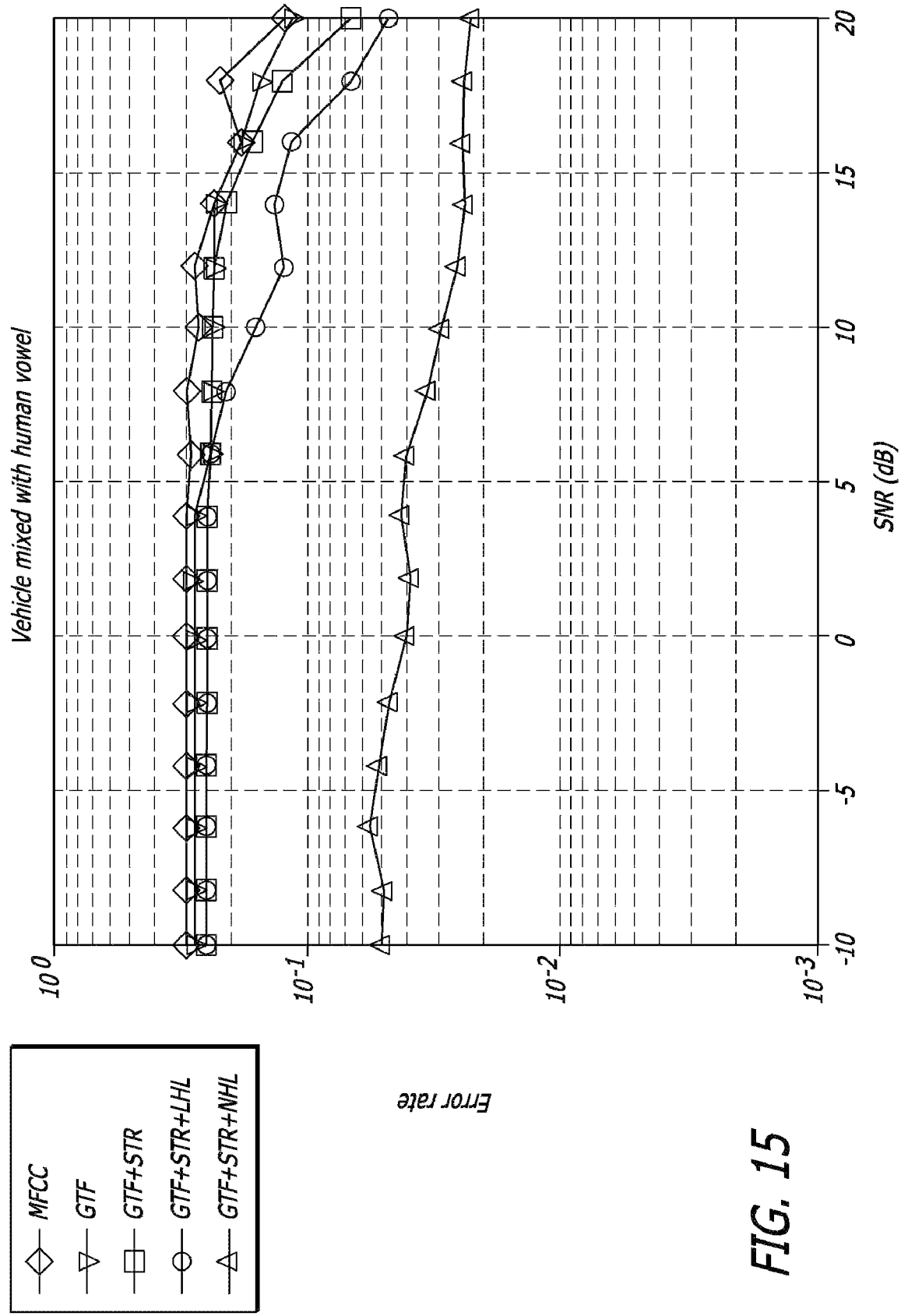
FIG. 15 illustrates a graph comparing the error rates of acoustic recognition systems using Mel frequency Cepstral computation (MFCC) and various combinations of each of gammatone filtering (GTF), spectro-temporal representation (STR), linear Hebbian learning (LHL), and nonlinear Hebbian learning (NHL) based on input waveforms of vehicles mixed with colored human vowel noise.

Secondly, the noise robustness of the proposed system was tested when vehicle sounds were corrupted by unknown colored noise, such as human vowel voice. Different vowels with various spectrums were mixed with vehicle sounds along the time. As shown in the comparison graph of FIG. 15, the compared results indicated that GTF was better than MFCC, for example, when SNR>5 dB the improvement was 5%. Using STR can improve system performance further. The averaged improvement was 3~5% at SNR −10~20 dB. Next, using LHL can improve the performance, while NHL can more significantly improve it. At very low SNR=−10 dB, LHL had error rate 24%, while NHL decreased it down to 5% with 19% improvement. In all, when SNR=−10~15 dB, the proposed system had low error rate 2.5~5%, with a total improvement 25~27.5% when compared with MFCC. Again this low error rate plateau implies the efficiency of NHL to eliminate human vowel effects on vehicle signals.

Figure 16:
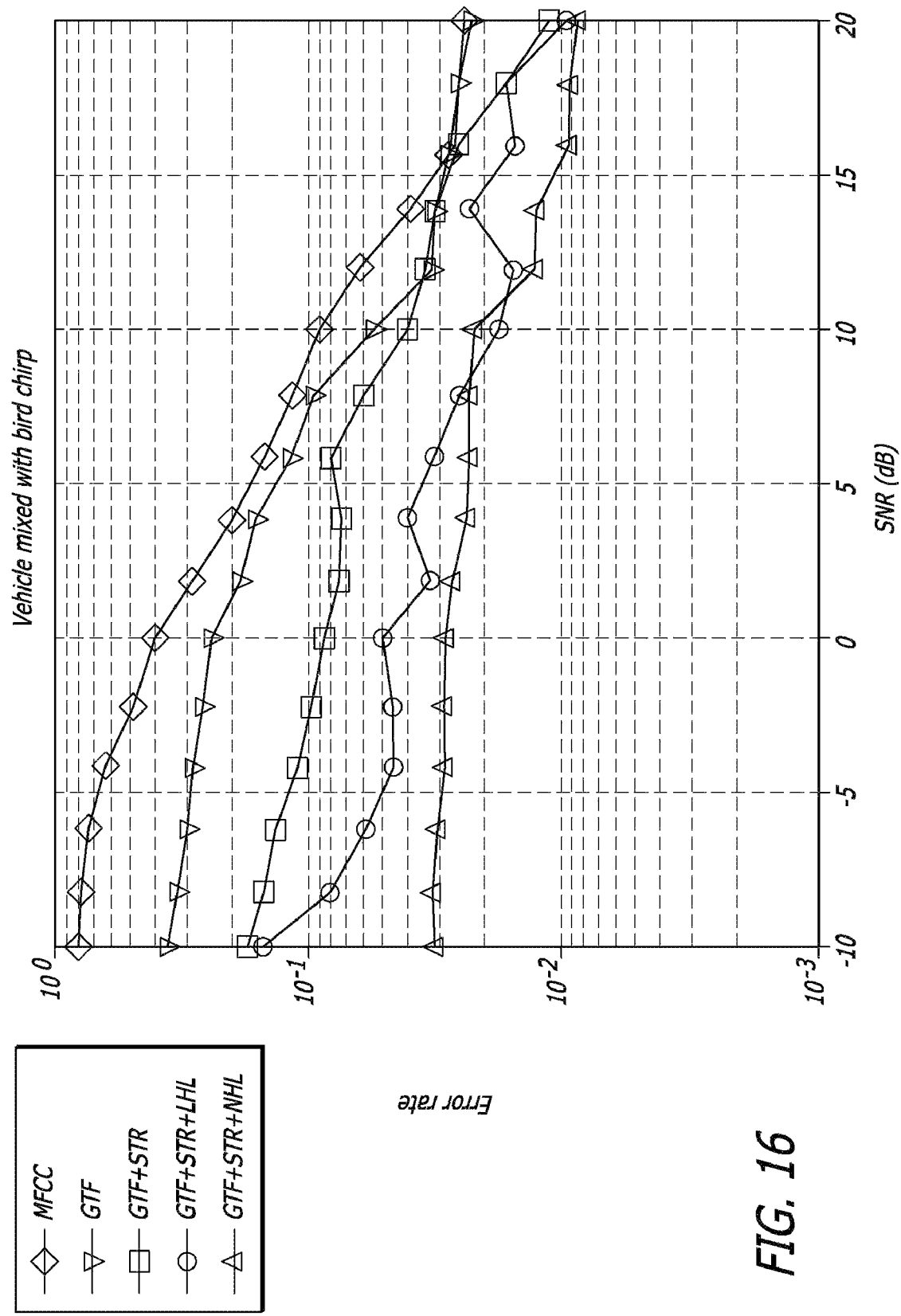
FIG. 16 illustrates a graph comparing the error rates of acoustic recognition systems using Mel frequency Cepstral computation (MFCC) and various combinations of each of gammatone filtering (GTF), spectro-temporal representation (STR), linear Hebbian learning (LHL), and nonlinear Hebbian learning (NHL) based on input waveforms of vehicles mixed with colored bird chirp noise.

Next the proposed system was tested against unknown bird chirp noise, another colored noise often existing in normal environments. Various bird chirps were mixed with vehicle sounds. The results are shown in the comparison graph of FIG. 16. GTF was better than MFCC, especially when SNR<15 dB. For example, at SNR=−10 dB, the error rate decreased from 74% to 35%. Using STR can improve system performance further, such as at SNR=−10 dB, the improvement was 18%. Next, using LHL can improve the performance, while NHL can more significantly improve it. At very low SNR=−10 dB, LHL had error rate 17%, while NHL decreased it down to 3% with 14% improvement. In all, increasing SNR from −10 to 10 dB, the proposed system had the error rate staying low at 2~3%, while MFCC had high error rate from 74% to 9%. This low error rate plateau again indicates that NHL had efficiently separated vehicle signals from bird chirps.

Vehicle Type Identification Under Noise Environments

If the coming waveform is recognized as a vehicle in active mode, then the type of vehicle needs to be decided. The sounds from various types of vehicles may be generated by some common factors and thus highly correlated with each other, which makes vehicle identification difficult. Vehicle identification is analyzed when vehicle data is corrupted by unknown noises. During testing, identification results are listed in Tables 1-3 when vehicle data was corrupted by unknown AWGN, human vowel, and bird chirp, respectively. From these tables, it can be seen that during SNR=5, 10 dB, the proposed system offers robust identification results, especially for diesel truck and motorcycle. At very low SNR=−5, 0 dB, the performance degrades, whereas the system is still at a workable status.

TABLE 1

Identification results when vehicle is mixed w/AWGN

| | Gasoline light track | Gasoline heavy track | Diesel truck | Motorcycle |
|---|---|---|---|---|
| SNR = −5 dB | 45% | 50% | 65% | 65% |
| 0 dB | 60% | 70% | 85% | 85% |
| 5 dB | 80% | 90% | 95% | 95% |
| 10 dB | 85% | 95% | 95% | 100% |

TABLE 2

Identification results when vehicle is mixed w/colored human vowel noise

| | Gasoline light track | Gasoline heavy track | Diesel truck | Motorcycle |
|---|---|---|---|---|
| SNR = −5 dB | 45% | 40% | 50% | 50% |
| 0 dB | 60% | 65% | 80% | 80% |
| 5 dB | 85% | 90% | 95% | 95% |
| 10 dB | 90% | 95% | 95% | 100% |

TABLE 3

Identification results when vehicle is mixed w/colored bird chirp noise

| | Gasoline light track | Gasoline heavy track | Diesel truck | Motorcycle |
|---|---|---|---|---|
| SNR = −5 dB | 60% | 70% | 80% | 80% |
| 0 dB | 80% | 90% | 90% | 90% |
| 5 dB | 85% | 90% | 95% | 95% |
| 10 dB | 85% | 95% | 100% | 100% |

The various components that have been discussed may be made from combinations of hardware and/or software, including operating systems and software application programs that are configured to implement the various functions that have been ascribed to these components above and in the claims below. The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

In short, the scope of protection is limited solely by the claims that now follow. That scope is intended to be as broad as is reasonably consistent with the language that is used in the claims and to encompass all structural and functional equivalents.

We claim:

1. An apparatus for identifying vehicles entering an area to be monitored using acoustic signatures, comprising:
    one or more microphones configured to capture, within a range of said area, sound produced by a source and to convert said sound into electrical signals;
    a memory unit configured to store one or more learned acoustic signatures of running vehicles;
    a processing system coupled to said memory unit and configured to measure, from said electrical signals, an acoustic pattern of said source;
        compare said acoustic pattern with one or more learned acoustic signatures of running vehicles stored in said memory unit;
        determine, based on said comparison, whether said acoustic pattern is indicative of a presence of a running vehicle; and
        identify, in response to detecting a running vehicle, a vehicle class.

2. The apparatus of claim 1 further comprising a wireless transmitter.

3. The apparatus of claim 2 wherein the processing system is further configured to transmit, via said wireless transmitter, information comprising said vehicle class to a central computer.

4. The apparatus of claim 1 further comprising an amplifier configured to amplify said electrical signals.

5. The apparatus of claim 1 wherein said one or more microphones comprise a distributed microphone array.

6. The apparatus of claim 1 wherein said measuring said acoustic pattern comprises using a radial basis function neural network.

7. The apparatus of claim 1 wherein said determining whether said acoustic pattern is indicative of a presence of a running vehicle comprises using a radial basis function neural network.

8. The apparatus of claim 1 wherein said measuring said acoustic pattern comprises using an expectation-maximization method.

9. The apparatus of claim 1 wherein said vehicle class comprises one of gasoline light wheeled, gasoline heavy wheeled, diesel truck, and motorcycle.

10. The apparatus of claim 1 wherein said area to be monitored comprises an asset to be protected.

11. The apparatus of claim 1 wherein said area to be monitored comprises a parking lot.

12. The apparatus of claim 1 wherein the acoustic signatures are recognized using Spectro-Temporal representation and a nonlinear Hebbian learning function.

13. The apparatus of claim 1 wherein expectation-maximizing is used for training.

14. A method for identifying approaching vehicles entering an area to be monitored using acoustic signatures, comprising:
    capturing, using one more microphones placed within a range of said area, sound produced by a source and converting said sound into electrical signals;
    measuring, from said electrical signals, an acoustic pattern of said source;
    comparing said acoustic pattern with one or more learned acoustic signatures of running vehicles;
    determining, based on said comparison, whether said acoustic pattern is indicative of a presence of a running vehicle; and
    identifying, in response to detecting a running vehicle, a vehicle class, processed by a processing system.

15. The method of claim 14 further comprising transmitting, via a wireless transmitter, information sufficient to identify said vehicle class to a central computer.

16. The method of claim 14 further comprising digitizing, using an analog-to-digital converter, said amplified electrical signals.

17. The method of claim 16 wherein said area to be monitored comprises an asset to be protected.

18. The method of claim 14 wherein the one or more microphones comprise a distributed microphone array.

19. The method of claim 14 wherein said measuring said acoustic pattern comprises using a radial basis function neural network.

20. The method of claim 14 wherein said determining whether said acoustic pattern is indicative of a presence of a running vehicle comprises using a radial basis function neural network.

21. The method of claim 14 wherein said vehicle class comprises one of gasoline light wheeled, gasoline heavy wheeled, diesel truck, and motorcycle.

22. A system for identifying vehicles entering one or more areas to be monitored using acoustic signatures, the system comprising:
    a central computer; and
    at least one on-site sensor located within each area to be monitored, each at least one on-site sensor configured to
        capture, using one more microphones placed within a range of said area, sound produced by a source and convert said sound into digitized electrical signals;
        measure, from said electrical signals, an acoustic pattern of said source;
        compare said acoustic pattern with one or more learned acoustic signatures of running vehicles;
        determine, based on said comparison, whether said acoustic pattern is indicative of a presence of a running vehicle;
        identify, in response to detecting a running vehicle, a vehicle class; and
        transmit information sufficient to identify said vehicle class to said central computer.

23. The system of claim 22 wherein said at least one on-site sensor further comprises a wireless transmitter from which said information is transmitted.

24. The system of claim 22 wherein said central computer is integrated into a command center.

* * * * *

UNITED STATES PATENT AND TRADEMARK OFFICE
CERTIFICATE OF CORRECTION

PATENT NO.       : 8,164,484 B2  
APPLICATION NO.  : 12/245564  
DATED            : April 24, 2012  
INVENTOR(S)      : Theodore W. Berger, Alireza Dibazar and Bing Lu Page 1 of 1

It is certified that error appears in the above-identified patent and that said Letters Patent is hereby corrected as shown below:

Title Page, Item (75) Inventors, second inventor first name "Alircza" should be changed to --Alireza--

Signed and Sealed this  
Third Day of July, 2012

David J. Kappos  
*Director of the United States Patent and Trademark Office*